(12) United States Patent
Nakadai

(10) Patent No.: US 10,073,857 B2
(45) Date of Patent: Sep. 11, 2018

(54) DISTRIBUTED DATA MANAGEMENT DEVICE AND DISTRIBUTED DATA OPERATION DEVICE

(71) Applicant: NEC Corporation, Minato-ku, Tokyo (JP)

(72) Inventor: Shinji Nakadai, Tokyo (JP)

(73) Assignee: NEC CORPORATION, Tokyo (JP)

(*) Notice: Subject to any disclaimer, the term of this patent is extended or adjusted under 35 U.S.C. 154(b) by 892 days.

(21) Appl. No.: 14/400,056

(22) PCT Filed: Mar. 15, 2013

(86) PCT No.: PCT/JP2013/001768
§ 371 (c)(1),
(2) Date: Nov. 10, 2014

(87) PCT Pub. No.: WO2013/171953
PCT Pub. Date: Nov. 21, 2013

(65) Prior Publication Data
US 2015/0120649 A1    Apr. 30, 2015

(30) Foreign Application Priority Data
May 15, 2012 (JP) .................................. 2012-111189

(51) Int. Cl.
*G06F 17/30* (2006.01)
*G06F 3/06* (2006.01)

(52) U.S. Cl.
CPC ........ *G06F 17/30194* (2013.01); *G06F 3/061* (2013.01); *G06F 3/067* (2013.01);
(Continued)

(58) Field of Classification Search
CPC ......... G06F 17/30327; G06F 17/30961; G06F 17/30625; G06F 17/30312; G06F 17/30336
See application file for complete search history.

(56) References Cited

U.S. PATENT DOCUMENTS 5,752,243 A    5/1998  Reiter et al.
7,937,399 B2   5/2011  Furusho
(Continued)

FOREIGN PATENT DOCUMENTS

CN    101128825 A    2/2008
CN    101180623 A    5/2008
(Continued)

OTHER PUBLICATIONS

Jagadish, Hosagrahar V., Beng Chin Ooi, and Quang Hieu Vu. "Baton: A balanced tree structure for peer-to-peer networks." Proceedings of the 31st international conference on Very large data bases. VLDB Endowment, 2005.*
(Continued)

*Primary Examiner* — Nan Hutton

(57) ABSTRACT

An object logical node achieved by a distributed data management device includes a storage unit for storing object node identifiers each uniquely assigned to a plurality of logical nodes, a storage unit for storing at least one of a plurality of partial data units, a link table for storing link information between the object logical node and a link destination logical node, a storage unit for storing a value range boundary value with respect to each attribute corresponding to the partial data unit, and a storage unit for storing a tree structure data unit with respect to each attribute including a plurality of tree nodes each indicating a value range for identifying the logical node storing the partial data unit corresponding to an access request, the tree structure data unit including a root tree node including at least one entry formed with a pointer pointing to a child tree node associated with the link destination logical node and a value indicating a value range for selecting the pointer.

19 Claims, 20 Drawing Sheets

(52) U.S. Cl.
CPC ...... *G06F 3/0644* (2013.01); *G06F 17/30327* (2013.01); *G06F 17/30336* (2013.01)

(56) References Cited

U.S. PATENT DOCUMENTS

| | | | |
|---|---|---|---|
| 7,962,494 B2 | 6/2011 | Furusho | |
| 2002/0150251 A1* | 10/2002 | Asano | G06F 21/10 380/277 |
| 2008/0313196 A1 | 12/2008 | Furusho | |
| 2009/0077625 A1* | 3/2009 | Van Der Linden | G06F 17/30917 726/1 |
| 2009/0106194 A1 | 4/2009 | Furusho | |
| 2009/0222530 A1 | 9/2009 | Buford et al. | |
| 2010/0131550 A1* | 5/2010 | Nakadai | H04L 45/00 707/769 |
| 2010/0169384 A1* | 7/2010 | Mazzagatti | G06Q 10/04 707/803 |
| 2010/0281165 A1 | 11/2010 | Gerdes et al. | |

FOREIGN PATENT DOCUMENTS

| | | |
|---|---|---|
| EP | 1764710 A1 | 3/2007 |
| EP | 1857945 A1 | 11/2007 |
| JP | 2005-094264 A | 4/2005 |
| JP | 2005-244630 A | 9/2005 |
| JP | 2008-234563 A | 10/2008 |
| JP | 2008-262507 A | 10/2008 |
| JP | 2009-508410 A | 2/2009 |
| JP | 2010-509692 A | 3/2010 |

OTHER PUBLICATIONS

Despain, Alvin M., and David A. Patterson. "X-Tree: A tree structured multi-processor computer architecture." Proceedings of the 5th annual symposium on Computer architecture. ACM, 1978.*

Chinese Office Action for CN Application No. 201380037661.5 dated Sep. 30, 2016 with English Translation.

Fay Chang et al, "Bigtable : A Distributed Storage System For Structured Data", Symposium on Operating Systems Design (SOSP) 2006, Nov. 6-8, 2006.

H.V. Jagadish et al, "BATON: A Balanced Tree Structure for Peer-to-Peer Networks", Very large data bases (VLDB) 2005, Aug. 30-Sep. 2, 2005.

Shinji Nakadai, et al., "PLATON: P2P Multi-dimensional Range Query System for Data Sharing in Distributed System", Multimedia, Distributed, Cooperative, and Mobile Symposium (DICOMO2007), IPSJ Symposium Series [CD-Rom], Jul. 4, 2007, vol. 2007, No. 1, pp. 173-184 with English Abstract.

International Search Report for PCT Application No. PCT/JP2013/001768, dated Apr. 6, 2013.

Extended European Search Report for EP Application No. EP13790415.7 dated Dec. 15, 2015.

* cited by examiner

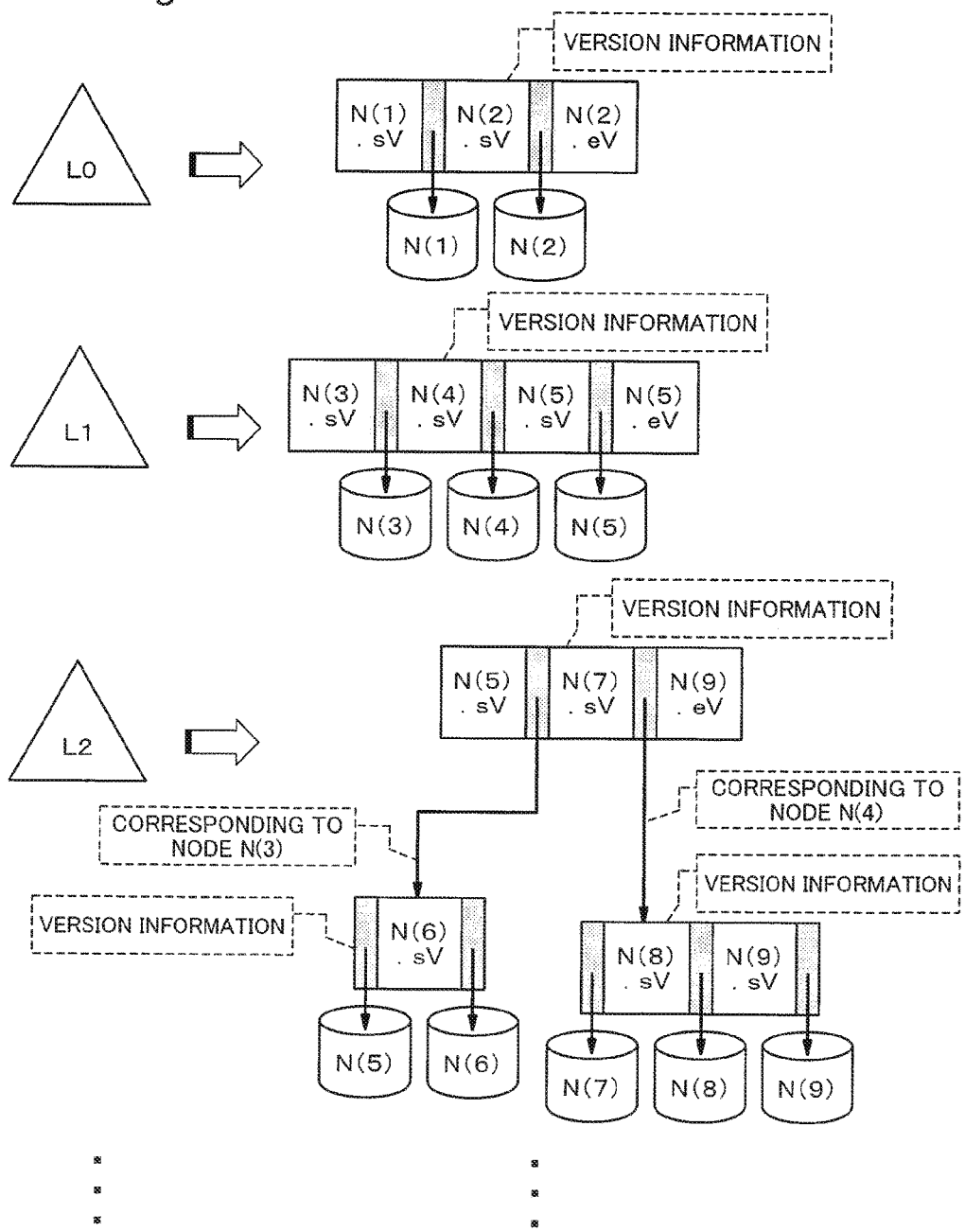

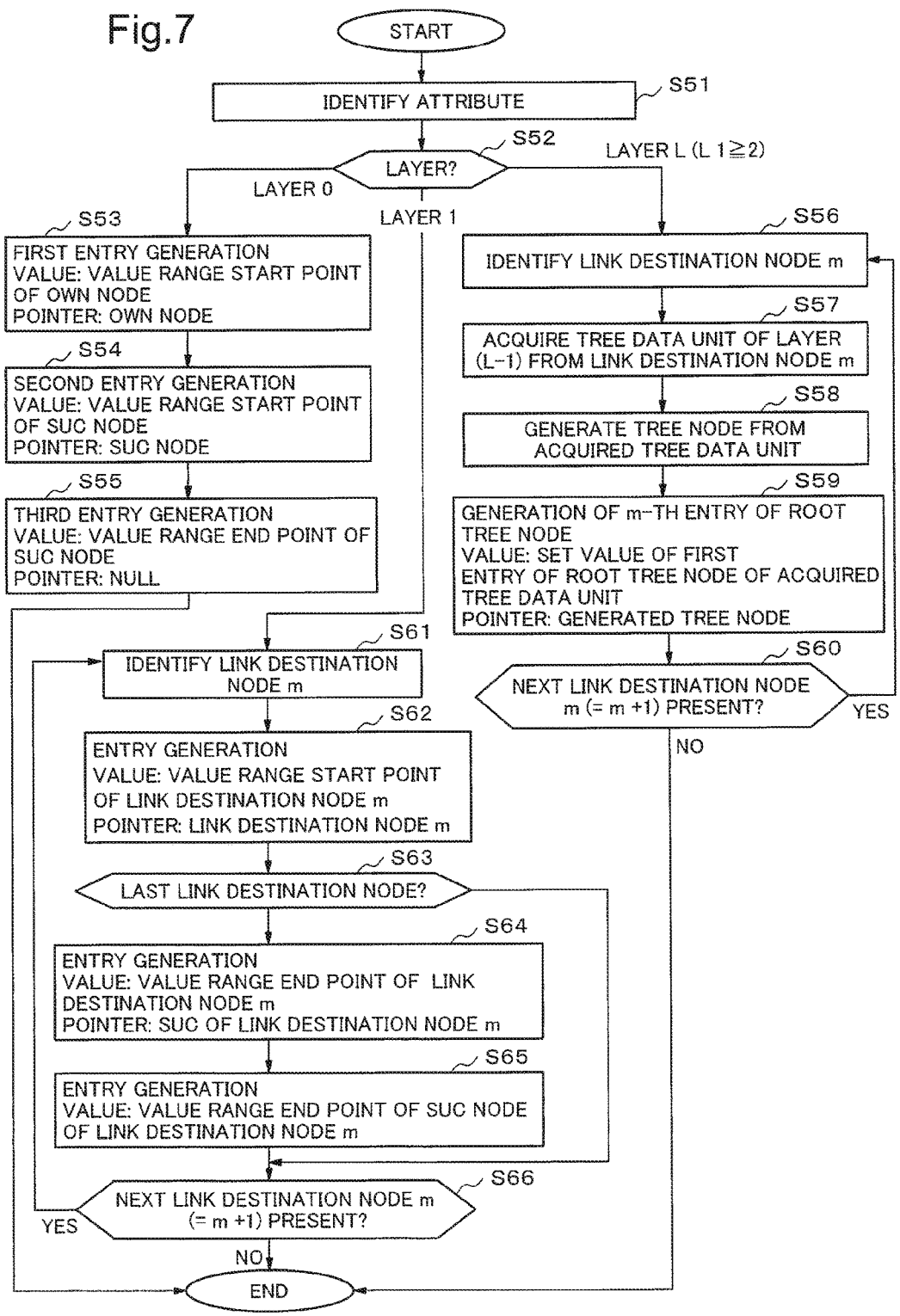

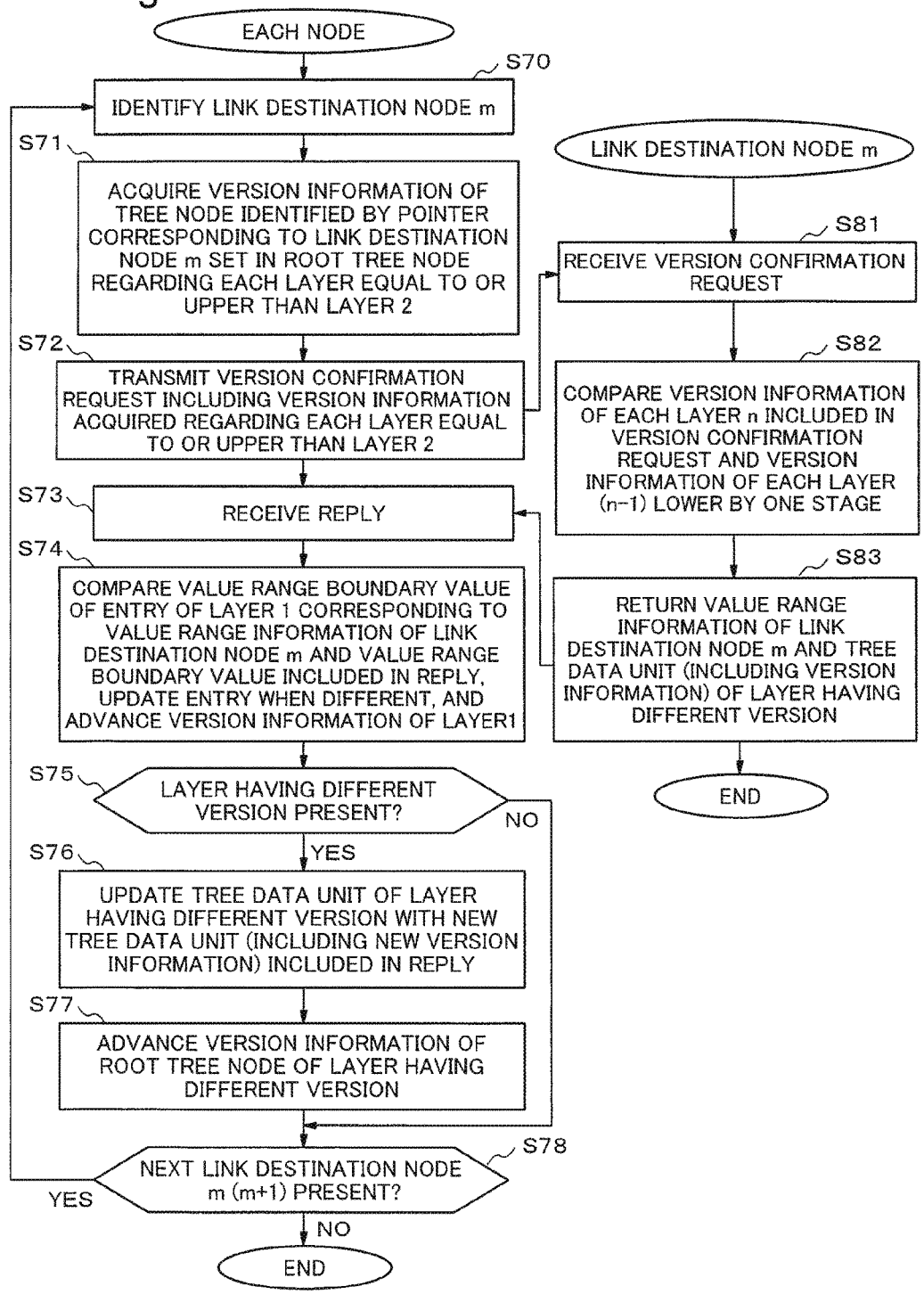

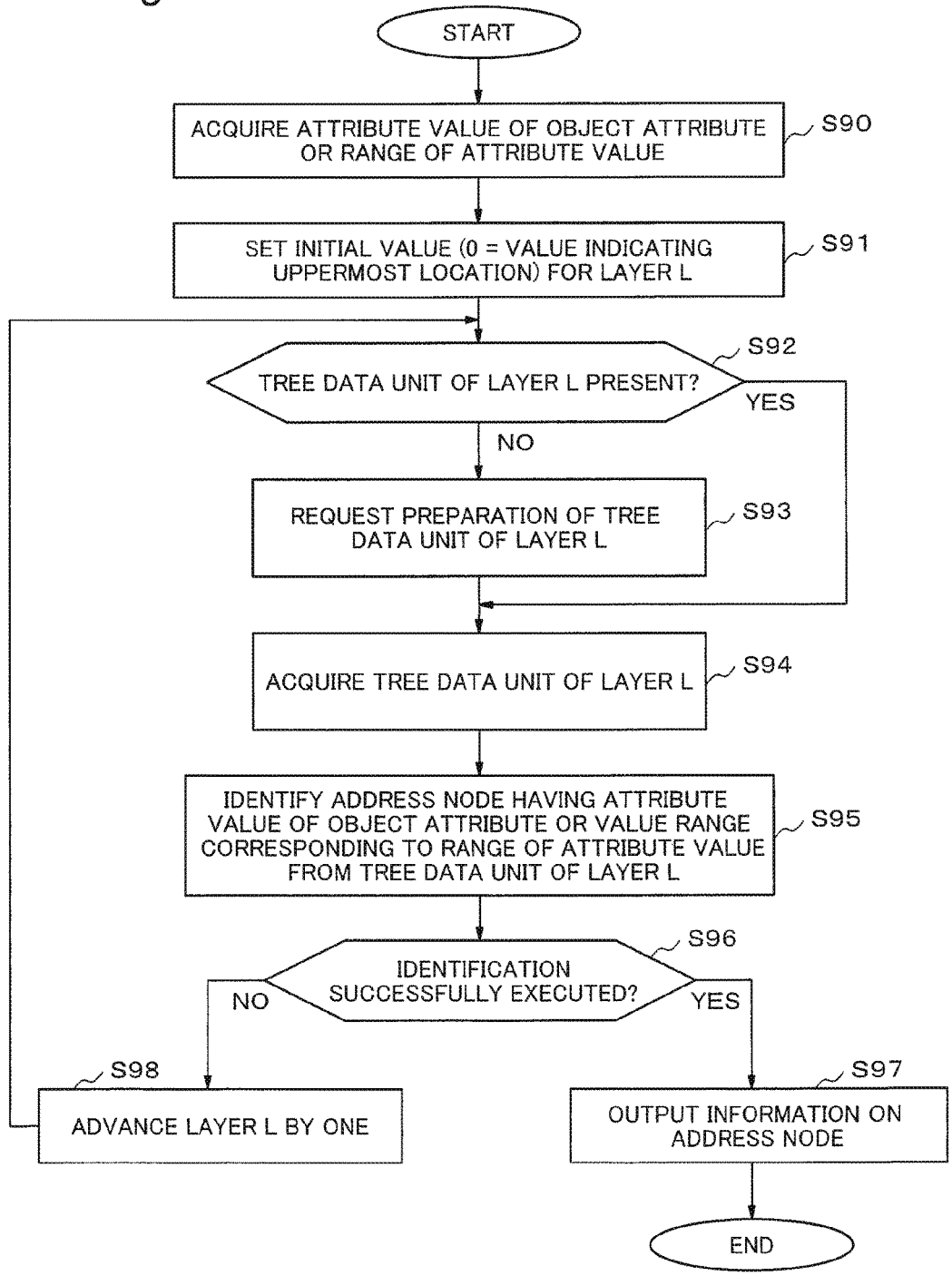

DISTRIBUTED DATA MANAGEMENT DEVICE AND DISTRIBUTED DATA OPERATION DEVICE

This application is a National Stage Entry of PCT/JP2013/001768 filed on Mar. 15 2013, which claims priority from Japanese Patent Application 2012-111189 filed on May 15 2012, the contents of all of which are incorporated herein by reference, in their entirety.

TECHNICAL FIELD

The present invention relates to a distributed management technique for data units ordered in attribute value order.

BACKGROUND ART

As basic data structures used by application programs, database systems, or the like, there are known structures referred to as an associative array, KeyValue Store, Map, and a storage engine acquiring a value from a key. Further, such data structures are categorized into a data structure where a key is ordered by a value thereof and a data structure where a key is stored without being ordered. In the configuration where no ordering is performed, a data storage destination of a key is determined based on a value obtained by hashing the key. On the other hand, in the configuration where ordering is performed, each storage destination is associated with has a value range for handling as a value range data unit and then a data storage destination is determined from the value range data unit and a key.

NPL 1 proposes one example of a value range management method in an information system. In the example of NPL 1, a system referred to as Bigtable includes tablet servers storing a plurality of data units, a Bigtable master, Chubby that is a centralized server, metadata•tablet servers, and clients. Each tablet server stores a data unit of a certain continuous value range as a tablet. The Bigtable master manages, by a B+Tree, in which tablet server a tablet is stored, stores a plurality of partial trees configuring the B+Tree on a plurality of metadata•tablet servers, and stores a partial tree corresponding to a root on Chubby. When a tablet managed by the tablet server is changed, this change is notified to the master. A client accessing this Bigtable acquires the root of the B+Tree by accessing Chubby and then acquires a partial tree thereof from the metadata•tablet server to be cached. While this cache is effective, the client can identify locally a tablet server corresponding to a key value. When a tablet handled by the tablet server is changed, the cache on the client becomes invalid, but it is not until the client accesses the tablet server corresponding to the key value that the client detects this invalidity and then makes an inquiry to the metadata•tablet server about valid information.

NPL 2 proposes another example of the value range management method. In the example of NPL 2, a system referred to as Baton includes a plurality of P2P (Peer to Peer) nodes. Each node stores data units having a continuous value range. Each node has a link relationship with another node and this link relationship forms a balanced tree as a whole. Each node includes a link to a node corresponding to a parent node in the tree structure, a link to a node corresponding to a child node, and links to adjacent nodes of the same layer. Regarding the links to the adjacent nodes of the same layer, a value range with respect to each link destination is also managed. Upon having acquired an access request for a given value, a certain node determines which one of the value ranges handled by the adjacent nodes in the same layer includes the value, and then transfers the access request to the determined node. When the node of the transfer destination continues similar processing, a node holding a data unit corresponding to the value is detected. A link relationship among nodes is sequentially changed to maintain the balanced tree when a node is newly added or a node leaves. Further, when a distribution of stored data units is distorted due to non-uniformity among nodes, each node changes a value range and a link relationship so as to uniform the data distribution.

CITATION LIST

Non Patent Literature

[NPL 1]
Fay Chang, Jeffrey Dean, Sanjay Ghemawat, Wilson C. Hsieh, Deborah A. Wallach Mike Burrows, Tushar Chandra, Andrew Fikes, Robert E. Gruber, "Bigtable: A Distributed Storage System For Structured Data", Symposium on Operating Systems Design (SOSP) 2006, 2006 Nov. 6-8.

[NPL 2]
H. V. Jagadish, Beng Chin Ooi, Quang Hieu Vu, "BATON: A Balanced Tree Structure for Peer-to-Peer Networks", Very large data bases (VLDB) 2005, 2005 Aug. 30-Sep. 2.

SUMMARY OF INVENTION

Technical Problem

However, the above value range management method has problems as described below.

In the method of NPL 1, when, for example, a value range of a node storing data units changes, a data access time of a client increases. The reason is that the client detects the change of the value range of the data storage node upon execution of an access to the data unit. In other words, after the detection, the client acquires a new value range from a metadata server and then re-executes a data access and therefore, this communication delay is taken as a data access time as-taken.

To solve this problem, it is conceivable that a configuration where a client periodically makes an inquiry to the metadata server about a value range is added to the method of NPL 1. However, according to such a configuration, a plurality of common metadata servers within the system receives requests from all clients in a predetermined interval, and with an increase in the number of clients, a load of the metadata server and a communication load within the system increase, resulting in a degradation of the performance of the entire system.

Further, in the method of NPL 2, when, for example, a data access request is sequentially transferred from a P2P node to another node, a node storing a data unit to be accessed is detected and therefore, a time for data access processing tends to increase. Further, in the method of NPL 2, a link relationship among nodes is updated according to a value range with respect to each attribute or a load of a node and therefore, with an increase in the number of attributes handled within the system, the number of link relationships among P2P nodes increases, resulting in an increase of a load for the management and update of the relationship and a possibility that a situation where further a failure easily occurs is generated.

In view of the circumstances as described above, the present invention has been completed and is intended to provide a distributed data management technique for reducing a data access time with suppressing a load in a system for distributed management of data units ordered in attribute value order.

Solution to Problem

Respective aspects of the present invention each employ the following configuration to solve the above problems.

A first aspect relates to a distributed data management device for achieving at least one object logical node among a plurality of logical nodes storing a plurality of partial data units where data units ordered in attribute value order are divided, the plurality of partial data units each including a value range with respect to each attribute. The object logical node achieved by the distributed data management device according to the first aspect includes: a node identifier storage unit for storing, as an object node identifier, an identifier assigned to an object logical node among a plurality of identifiers uniquely assigned to a plurality of logical nodes respectively in a finite identifier space having a ring structure; a data storage unit for storing at least one of a plurality of partial data units; a link table for storing link information indicating a communicable relationship between the object logical node and another logical node, the link information between the object logical node and a link destination node being established according to a relationship with the object node identifier in the identifier space; a value range storage unit for storing a value range boundary value with respect to each attribute corresponding to the partial data unit stored on the data storage unit, a value range boundary with respect to the each attribute being located between the object logical node and a logical node adjacent to the object logical node in the identifier space; and a tree storage unit for storing a tree structure data unit with respect to each attribute including a plurality of tree nodes each indicating a value range for identifying a logical node storing the partial data unit corresponding to an access request, the tree structure data unit including a root tree node including at least one entry formed with a pointer pointing to a child tree node associated with the link destination logical node and a value indicating a value range for selecting the pointer.

Another aspect of the present invention may be a program causing a computer to achieve an object logical node as described above or may be a computer-readable recording medium recorded with such a program. This recording medium includes a non-transitory, tangible medium.

Advantageous Effects of Invention

According to the above aspects, in a system for distributed management of data units ordered in attribute value order, a distributed data management technique for reducing a data access time with inhibiting a load can be provided.

BRIEF DESCRIPTION OF DRAWINGS

The above-described object and other objects as well as features and advantages will become further apparent from the following description of preferred embodiments when taken with the following accompanying drawings.

FIG. 6B is a view schematically illustrating an example of a tree structure data unit of the node N(1) based on the link examples of FIG. 3 and FIG. 4, in a management form 6.

FIG. 7 is a flowchart illustrating an operation example of a tree generation unit in the first embodiment.

FIG. 8 is a flowchart illustrating an operation example of a tree update unit and a version comparison unit in the first embodiment.

FIG. 9 is a flowchart illustrating an operation example of a tree search unit in the first embodiment.

DESCRIPTION OF EMBODIMENTS

Figure 1:
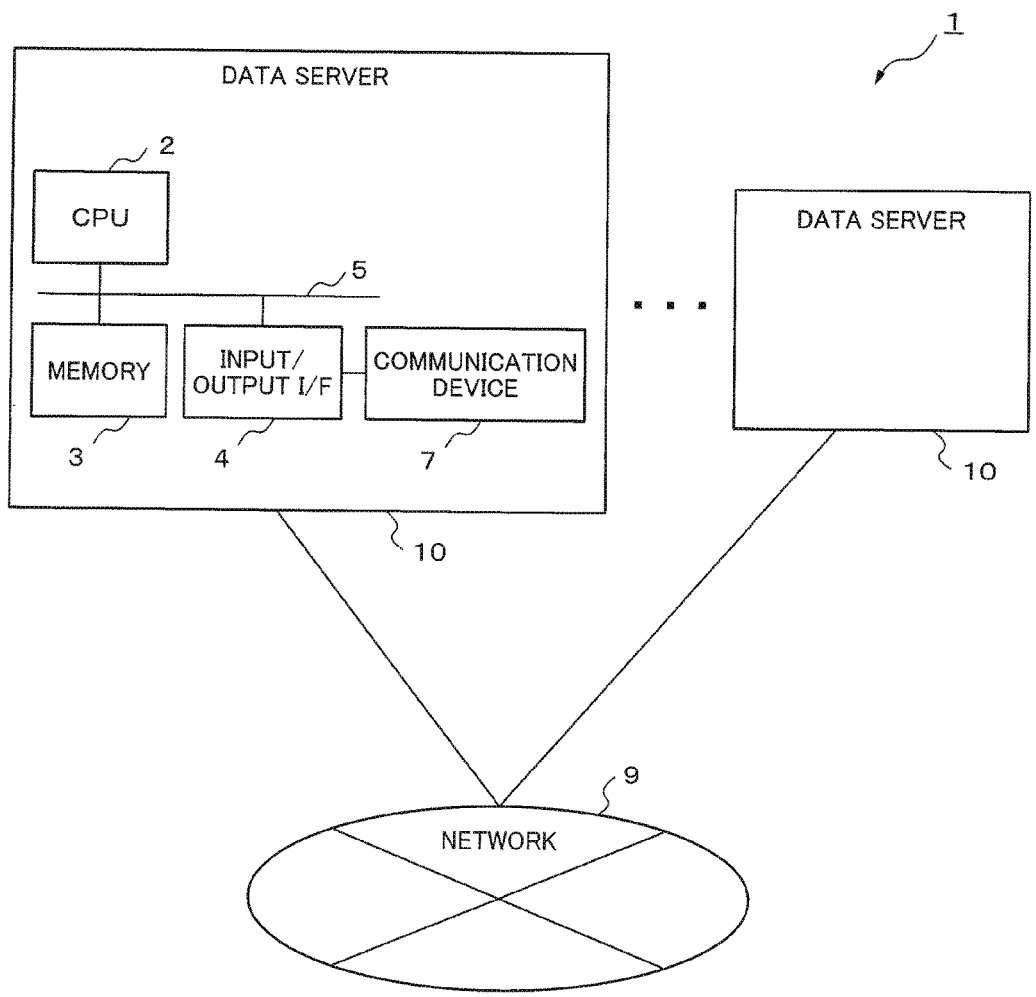
FIG. 1 is a view schematically illustrating a configuration example of a distributed system in a first embodiment.

The embodiments of the present invention will now be described. The embodiments given below are illustrative and the present invention is not limited to the configurations of the following embodiments.

A distributed data management device according to the present embodiment achieves at least one object logical node among a plurality of logical nodes storing a plurality of partial data units where data units ordered in attribute value order are divided, the plurality of partial data units each including a value range with respect to each attribute. The object logical node in the present embodiment includes a node identifier storage unit for storing object node identifiers, a data storage unit for storing the partial data units, a link table for storing link information between the object logical node and a link destination logical node, a value range storage unit for storing a value range boundary value with respect to each attribute corresponding to the partial data unit stored on the data storage unit, and a tree storage unit for storing a tree structure data unit with respect to each attribute including a root tree node including at least one entry including a pointer pointing to a child tree node associated with the link destination logical node and a value indicating a value range for selecting the pointer.

The logical node refers to a software element such as a task, a process, an instance, and the like and is achieved by a computer such as the distributed data management device according to the present embodiment. Further, the object node identifier refers to an identifier assigned to an object logical node among a plurality of identifiers each uniquely assigned to a plurality of logical nodes in a finite identifier space having a ring structure. In other words, each logical node is assigned with a unique identifier (hereinafter, expressed also as a node ID or an ID). The finite identifier space having a ring structure refers to an identifier space defined in such a manner that a maximum identifier is flowed by a minimum identifier in the space.

The object logical node establishes a link with another logical node (the link destination logical node) according to a relationship between an object node identifier and another identifier in the identifier space. Link establishment means that an object logical node becomes communicable with the link destination logical node, and is achieved by mutual possession of an IP (Internet Protocol) address, for example. The present embodiment does not limit any method for achieving the link.

In this manner, in the present embodiment, in a plurality of logical nodes for distributed management of data units, a topology based on node IDs is constructed.

On the other hand, each logical node manages value range information corresponding to a partial data unit stored similarly to the above value range storage unit. Then, a value range boundary with respect to each attribute is located between logical nodes adjacent to each other in an identifier space. In other words, a value range with respect to each attribute handled by each logical node is determined according to a ring structure of a node ID space. Thereby, in the same manner as in the node ID space, an attribute value space with respect to each attribute can be managed so as to have a circulating order (a ring structure). This refers also to a configuration where management is performed by overlapping a value range information view of an attribute value space on a link topology of the node ID space. This configuration makes it possible to respond to a value range change, without changing the link topology of the node ID space, by changing only the value range information view overlapped therewith.

A value range boundary value stored on the value range storage unit may be a start point of a value range of a partial data unit stored by an object logical node, an end point of the value range, or a combination of the start point and the end point of the value range. Further, the value range storage unit may store not only a value range boundary value of an object logical node but also a value range boundary value of a partial data unit stored by an adjacent node of the object logical node.

In the present embodiment, the object logical node stores a tree structure data unit reflected with such a value range of each logical node, and when an entry of a tree node stored in this tree structure data unit is referred to, a logical node storing a partial data unit including an arbitrary attribute value is identified. In the present embodiment, as described above, an entry of a root tree node included in the tree structure data unit includes a pointer pointing to a child tree node associated with the link destination logical node.

In this manner, the tree structure data unit in the present embodiment is reflected with a link relationship among logical nodes on a topology constructed based on node IDs and therefore, the object logical node can identify immediately a link destination logical node while searching tree structure data units. Thereby, the present embodiment makes it easy to achieve a form for acquiring value range information from a link destination logical node, a form for confirming value range information included by the link destination logical node, and the like. With any one of such forms, the object logical node need not make an inquiry to a given server about a value range change and therefore, load concentration on such a given server can be prevented.

Further, in the present embodiment, when referring to tree structure data units stored by itself as described above, the logical node can identify a logical node storing a desired value range and therefore, internode transfer for a data access request becomes unnecessary. As a result, an increase in a data access time associated with the internode transfer of a data access request can be prevented.

The above embodiment will be described below in more detail.

First Embodiment

System Configuration

FIG. 1 is a view schematically illustrating a configuration example of a distributed system 1 in the first embodiment. The distributed system 1 in the first embodiment includes a plurality of data servers 10. The data servers 10 are communicably connected to each other via a network 9. The data server 10 corresponds to the distributed data management device in the above-described embodiment. The data server 10 accesses data units stored on the data server 10 to acquire a desired data unit according to an application or a request from another terminal.

The data server 10 is a so-called computer and includes a CPU (Central Processing Unit) 2, a memory 3, and an input/output interface (I/F) 4 connected to each other via a bus 5, for example. The memory 3 is a RAM (Random Access Memory), a ROM (Read Only Memory), a hard disk, a portable storage medium, or the like. The input/output I/F 4 is connected to a communication device 7 for communicating with another data server 10, a data operation client 50, another terminal, and the like via the network 9. The input/output I/F 4 may be connected to a user interface device such as a display device, an input device, and the like. The present embodiment does not limit the hardware configuration of the data server 10.

[Device Configuration]

Figure 2:
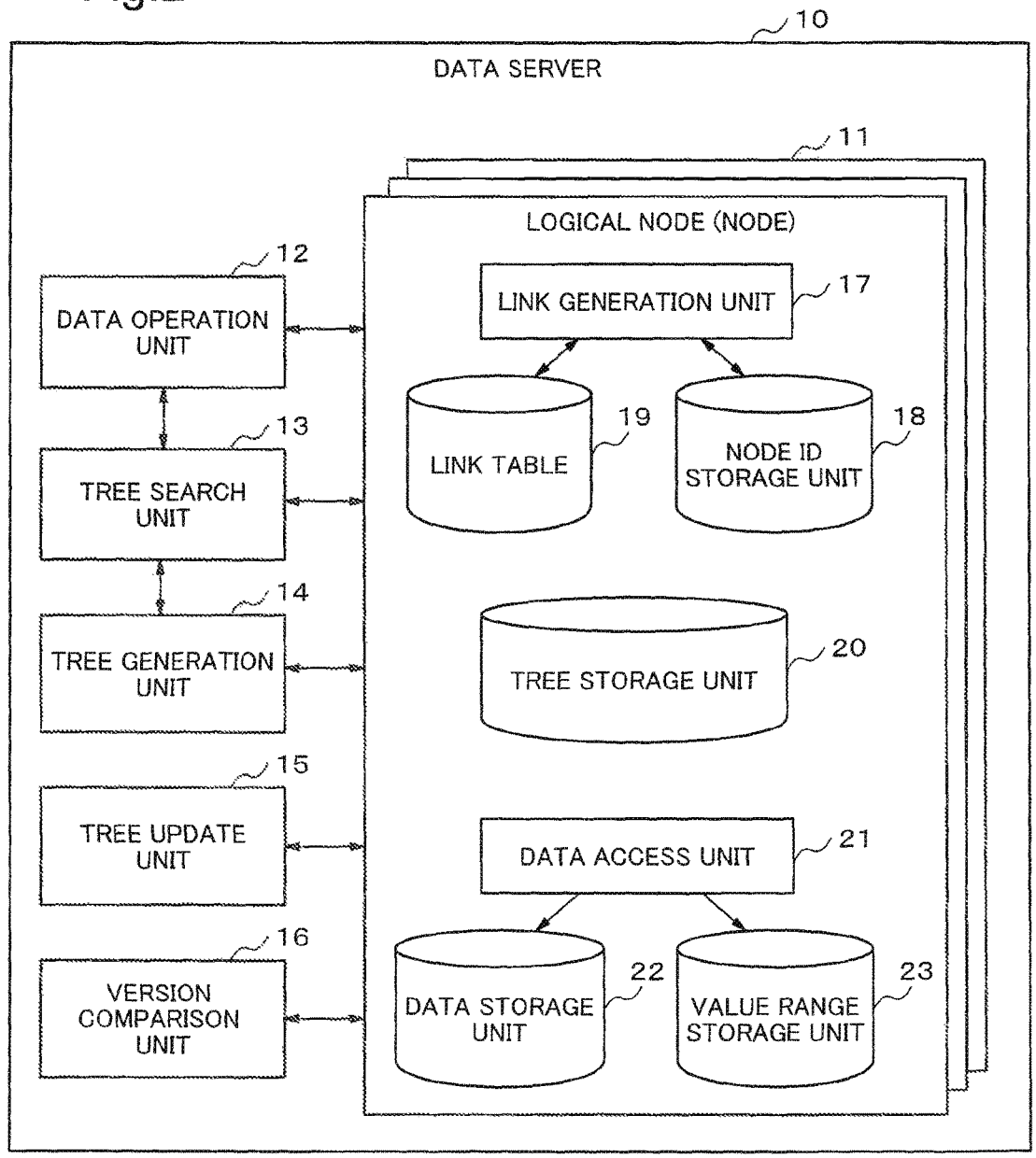
FIG. 2 is a view schematically illustrating a processing configuration example of a data server in the first embodiment.

FIG. 2 is a view schematically illustrating a processing configuration example of the data server 10 in the first embodiment. As illustrated in FIG. 2, the data server 10 includes a data operation unit 12, a tree search unit 13, a tree generation unit 14, a tree update unit 15, a version comparison unit 16, and at least one logical node 11. Each logical node includes a link generation unit 17, a node ID storage unit 18, a link table 19, a tree storage unit 20, a data access unit 21, a data storage unit 22, and a value range storage unit 23.

These processing units are achieved by executing a program stored on the memory 3 using the CPU 2. This program is installed from a portable recording medium such as a CD (Compact Disc), a memory card and the like or from another computer on a network via the input/output I/F 4 and stored on the memory 3. In the example of FIG. 2, the logical node 11 and the respective processing units 12 to 16 are illustrated as different software elements but the processing units 12 to 16 may be provided for each logical node 11. Hereinafter, the logical node 11 is also expressed simply as the node 11.

<Logical Node>

The respective processing units included in each node 11 will be each described.

The node ID storage unit 18 corresponds to the node identifier storage unit in the above embodiment. In other words, the node ID storage unit 18 stores a node ID assigned to each node 11 in a finite ID space having a ring structure. As the node ID, for example, a hash value of an IP address of a corresponding server is used.

The link table 19 stores a link relationship between the node 11 and another node, as described in the above embodiment. The link table 19 in the first embodiment stores a node ID and an IP address corresponding to the node regarding each of other nodes, and a link relationship with an own node 11. The IP address corresponding to each node refers to an IP address used to communicate with the respective nodes, and, for example, an IP address of the data server 10 where the respective nodes are achieved. Further, the link relationship stored on the link table 19 includes information whether a link is established with the own node 11 and a number (an order of a link or the like) for identifying the link when link establishment is made.

The link generation unit 17 constructs a link relationship based on a distance in an ID space between an ID of the own node 11 and an ID of another arbitrary node in the distributed system 1 and reflects the content in the link table 19. For this construction of a link relationship (the construction of an ID topology), for example, a Chord algorism, a Koorde algorism, or the like is used. The first embodiment does not limit a method for constructing an ID topology when a topology is constructed so as to have a ring structure in a finite ID space.

Figure 3:
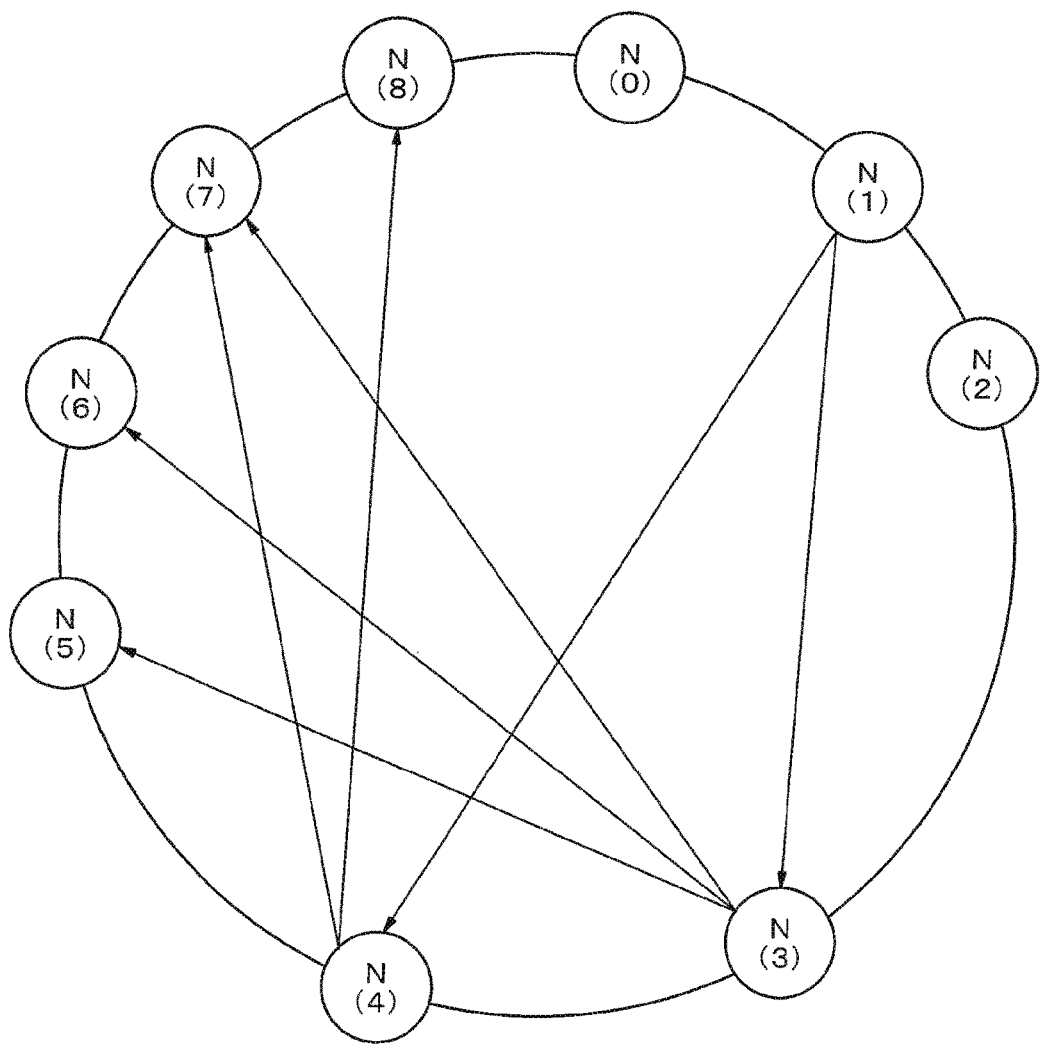
FIG. 3 is a view schematically illustrating an example of a link relationship among logical nodes.
Figure 4:
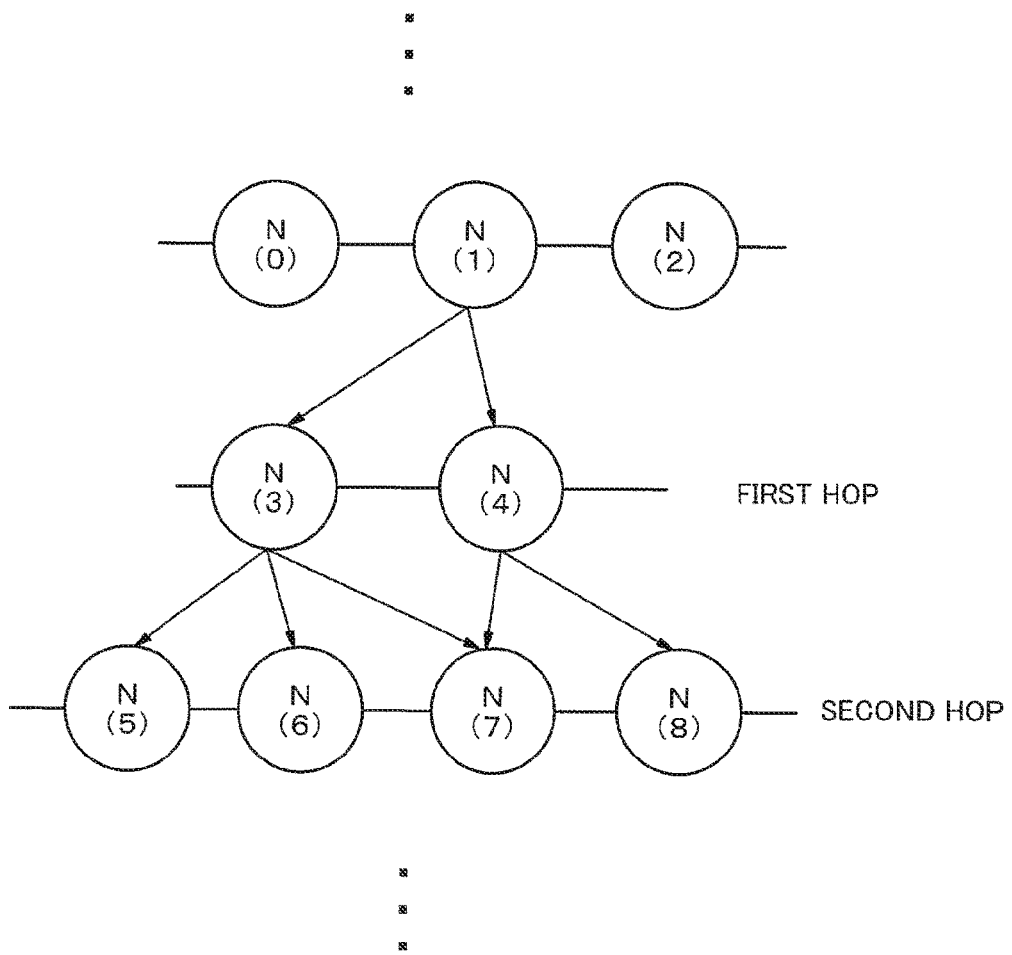
FIG. 4 is a view schematically illustrating a link relationship including a node N(1) illustrated in FIG. 3 as a reference.

FIG. 3 is a view schematically illustrating an example of a link relationship among logical nodes 11. FIG. 4 is a view schematically illustrating a link relationship including a node N(1) illustrated in FIG. 3 as a reference. In the examples of FIG. 3 and FIG. 4, the node N(1) is linked with a node N(3) and a node N(4), the node N(3) is linked with a node N(5), a node N(6) and a node N(7), and the node N(4) is linked with the node N(7) and a node N(8).

On the other hand, as illustrated in the example of FIG. 3, the ID space has a ring structure. Hereinafter, this ring structure is also expressed as an ID ring. On this ID ring, regarding each node 11, a node 11 having an ID that is larger than and also closest to an ID of the own node 11 is expressed as a Successor node or a Suc node, and a node 11 having an ID that is smaller than and also closest to the ID of the own node 11 is expressed as a Predecessor node or a Pred node. On the ID ring, a node 11 having a node ID of a maximum value in the ID space regards a node 11 having a node ID of a minimum value in the ID space as a Suc node, and the node 11 having the node ID of the minimum value in the ID space regards the node 11 having the node ID of the maximum value on the ID space as a Pred node. Such a link relationship on the ID ring can be immediately identified by a node ID value, and therefore, need not be stored on the link table 19 or may be stored on the link table 19 together with a relationship among nodes being not adjacent to each other on the ID space as described above.

Hereinafter, an adjacent node 11 on the ID ring is expressed as a Suc node or a Pred node, and a node 11 where a link is established without being adjacent on the ID ring is expressed as a link destination node. Further, as illustrated in FIG. 4, a distance from a certain node 11 to another node reached by following a link is expressed as a hop. In other words, a node directly linked with a certain object node 11 is expressed as a link destination node of a first hop of the object node 11, and a node directly linked with the link destination node of the first hop is expressed as a link destination node of a second hop of the object node 11.

The data storage unit 22 stores a part of partial data units among a plurality of partial data units where data units ordered in attribute value order are divided, as described in the above embodiment. Data units handled in the present embodiment are data units configured with a plurality of columns (tuples) each including a plurality of rows (attributes). However, the present embodiment does not limit a form of data units. For example, attribute values stored may be those where one-dimensional values are obtained by space-filling curve processing of a plurality of attribute values. Further, when, for example, the present embodiment is applied to a data stream system or a Publish/Subscribe (Pub/Sub) system, the data unit may be a conditional equation or the like instead of a data unit itself. In such a system, a value, a range, or the like of a search key treated as a condition for searching a database for a data unit becomes a data unit to be detected. In other words, when a range of a temperature intended to be detected is provided as one conditional equation (Subscribe), the range is set to be a two-dimensional value that is $(\times 0, \times 1)$=(lower limit value, upper limit value) and then stored as a value obtained by being allowed to be one-dimensional. When a plurality of conditional equations is provided, a plurality of one-dimensional values each representing each conditional equation is stored on the system. When a data unit of a given attribute value is published to the system and then notified to a notification destination corresponding to a conditional equation such as one including the attribute value in conditions, a multidimensional range where $\times 0$ is included in a range of $[-\infty, \text{attribute value}]$ and $\times 1$ is included in a range of $[\text{attribute value}, \infty]$ is searched. This can be achieved by searching a conditional equation included in a one-dimensional range corresponding to this multidimensional space from a plurality of conditional equations previously stored. In this manner, the present embodiment is applicable to not only data search but also Pub/Sub including a range as a condition in the same manner.

Partial data units stored on the data storage unit 22 each have a value range with respect to each attribute.

The value range storage unit 23 stores, as a metadata unit, a boundary value of a value range with respect to each attribute across another node with which data units are divided together, as described in the above embodiment. Another node where a value range is divided together with a given node is an adjacent node having an ID closest in distance to an ID of the given node in the ID space. As described above, there are various forms regarding a value range boundary value stored on the value range storage unit 23 in each node. There are, for example, a form where regarding a value range corresponding to a partial data unit stored by the own node, a start point of the value range is managed as a value range boundary value (management form 1), a form where an end point of the value range is managed as a value range boundary value (management form 2), and a form where both the start point and the end point are managed (management form 3). Further, conceivable are a form where both a start point and an end point of a value range corresponding to a partial data unit stored by a Suc node are managed (management form 4), a form where both a start point and an end point of a value range corresponding to a partial data unit stored by a Pred node are managed (management form 5), a form where both a start point and an end point of a value range regarding each of the own node and a Suc node are managed (management form 6), a form where both a start point and an end point of a value range regarding each of the own node and a Pred node are managed (management form 7), and the like.

The management form is desirably selected by system requirements. When, for example, the simplest configuration is desired, the management form 1 or 2 is selectable. Further, in a system where, for example, data consistency is necessary, the management form 3, 6, or 7 is selectable. In such a system, value range boundary values are synchronized between adjacent nodes. Further, in a system where, for example, higher failure resistance is necessary, the management form 4, 5, 6, or 7 is selectable according to an adjacent node (a Suc node or a Pred node) acting as a secondary node (backup node) of the own node. In such a system, an adjacent node (a Suc node or a Pred node) of an object node manages value range information of the object node. The present embodiment does not limit the form of such value range information managed in each node.

Figure 5:
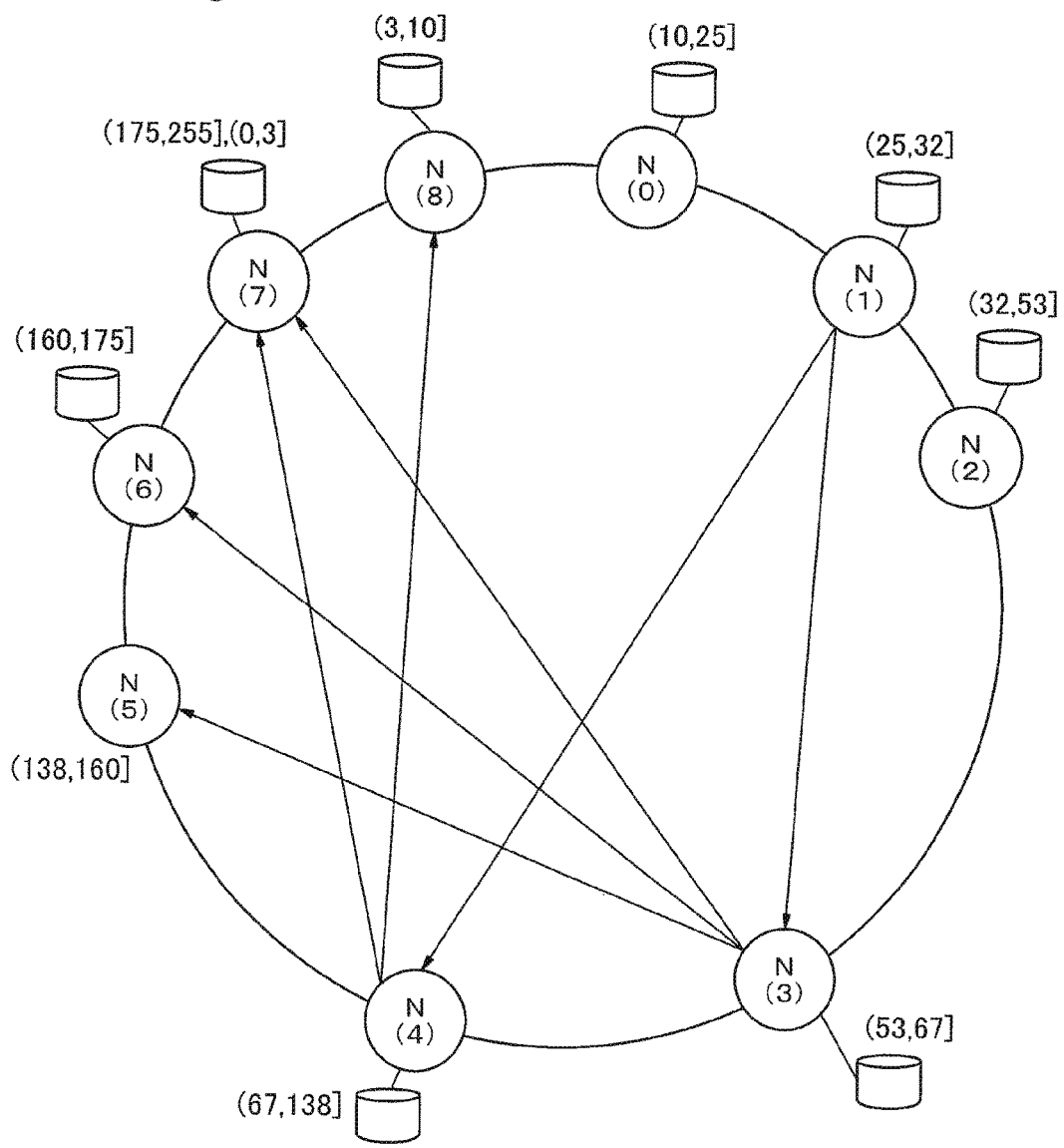
FIG. 5 is a view schematically illustrating a relationship between an ID ring and value range information.

FIG. 5 is a view schematically illustrating a relationship between an ID ring and value range information. In use of the management form 2 in the example of FIG. 5, a node N(0) stores a value range boundary value (25) regarding a boundary of a value range with an adjacent node N(1), and the node N(1) stores a value range boundary value (32) regarding a boundary of a value range with an adjacent node N(2). Even when any management form is used as a management form of value range information in this manner, a value range with respect to each attribute handled by each node is determined according to a ring structure of the ID space and therefore, it is possible to manage an attribute value space as one having a circulating order (ring structure) in the same manner as the node ID space.

According to this circulating order, when in a given attribute, a certain value range boundary value is designated as a reference value (a start point in the circulating order), an arbitrary value somewhere from the reference value to a maximum value in the attribute value space is smaller than an arbitrary value somewhere from a minimum value in the attribute value space to the reference value. According to the circulating order in the example of FIG. 5, upon considering a range of an attribute value handled by the node N(6) to the node N(8) each, when a value range boundary value (175) handled by the node N(6) is designated as a reference value, an attribute value (5) is determined to be larger than the value range boundary value (175) handled by the node N(6). Further, an attribute value (200) is determined to be larger than the value range boundary value (175) possessed by the node N(6) and to be smaller than a value range boundary value (3) possessed by the node N(7). Such a circulating order in the attribute value space is used, for example, by the tree search unit 13 or the like.

The data access unit 21 receives a data access request to an own node 11 and then determines whether an attribute value or a range of the attribute value included in the request is included in a value range handled by the own node 11 stored on the value range storage unit 23. In the case of no inclusion, the data access unit 21 issues a reply of invalidity to a requestor of the request, and when the included attribute value or the range of the attribute value exists, arbitrary processing for the data storage unit 22 is permitted and then the result is returned to the requestor of the request.

The tree storage unit 20 stores a tree structure data unit with respect to each attribute including a plurality tree nodes each indicating a value range, as described in the above embodiment. The tree structure data unit stored on the tree storage unit 20 in the first embodiment includes a plurality of layers, and each layer includes a tree data unit. Hereinafter, to be distinguished from the logical node 11, a node as an element configuring this tree structure data unit will be expressed as a tree node. Further, to be distinguished from a layer possessed by the tree structure data unit, a layer possessed by each tree data unit in respective layers included in the tree structure data unit will be expressed as a stage.

The tree node is distinguished as a root tree node, a branch tree node, or a leaf tree node according to existing stages. The root node and the branch node each include a pointer pointing to a node lower by one stage (a child tree node), and the leaf node includes a pointer pointing to a data unit capable of identifying a logical node 11 functioning as a data storage destination. Each tree node includes an entry including such a pointer and value range information for identifying a range selecting such a pointer.

The tree node in the first embodiment has such a structure similar to an existing tree data structure for data search such as a B tree and the like, as well as the following feature. Specifically, in each root tree node of each tree data unit, a range of an attribute value including none of the attribute values in an object attribute can be set. A conventional tree data structure includes one tree data unit and therefore, in the root tree node, a range of an attribute value including all attribute values in an object attribute is set. On the other hand, each root tree node of each layer in the first embodiment supports a part of ranges of all attribute values in an object attribute and all root tree nodes of all layers support the ranges of all the attribute values in the object attribute.

A tree data unit of a first layer (Layer 0) is generated from value range information possessed by an own node in the value range storage unit 23. Therefore, a configuration of the tree data unit of Layer 0 corresponds to a management form of value range information as described above. Therefore, for example, a tree data unit of Layer 0 of the management form 6 is formed with a root tree node including three entries as described below. In this case, the root tree node includes a placement of a leaf tree node. A first entry includes a start point of a value range handled by the own node (an end point of a value range handled by a Pred node of the own node) and a pointer pointing to a data unit capable of identifying the own node. A second entry includes an end point of a value range handled by the own node (a start point of a value range handled by a Suc node of the own node) and a pointer pointing to a data unit capable of identifying the Suc node of the own node. A third entry includes an end point of the value range handled by a Suc node of the own node and no value (Null). A data unit capable of identifying a certain node will be hereinafter expressed as a node identification data unit, and for the node identification data unit, for example, a node ID is used.

A tree data unit of a second layer (Layer 1) is generated from value range information possessed by a link destination node in the value range storage unit 23. Therefore, a configuration of a tree data unit of Layer 1 also corresponds to a management form of value range information as described above. For example, a tree data unit of Layer 1 of the management form 4 includes a plurality of entries as described below. In each entry, an end point of a value range handled by each link destination node and a pointer pointing to a node identification data unit of a Suc node of the link destination node are set, and for a value range boundary value of the last entry, an end point of a value range handled by a Suc node of the last link destination node is set and for the pointer, Null is set. The last link destination node refers to a link destination node having a maximum ID value among a plurality of link destination nodes.

A tree data unit of Layer L (L is an integer of at least 2) is formed with information regarding each link destination node of an L-th hop and has an L-stage configuration. A root tree node of the tree data unit of Layer L includes at least one entry including a pointer pointing to a child tree node associated with a link destination node and a value indicating a value range for selecting this pointer. A form of associating the pointer pointing to a child tree node with the link destination node is not limited, when a node identification data unit (e.g., a node ID) of the corresponding link destination node can be acquired from the pointer. Tree nodes lower than the root tree node of Layer L are generated from a tree data unit of Layer (L−1) in the link destination node. This generation method will be described later.

Figure 6A:
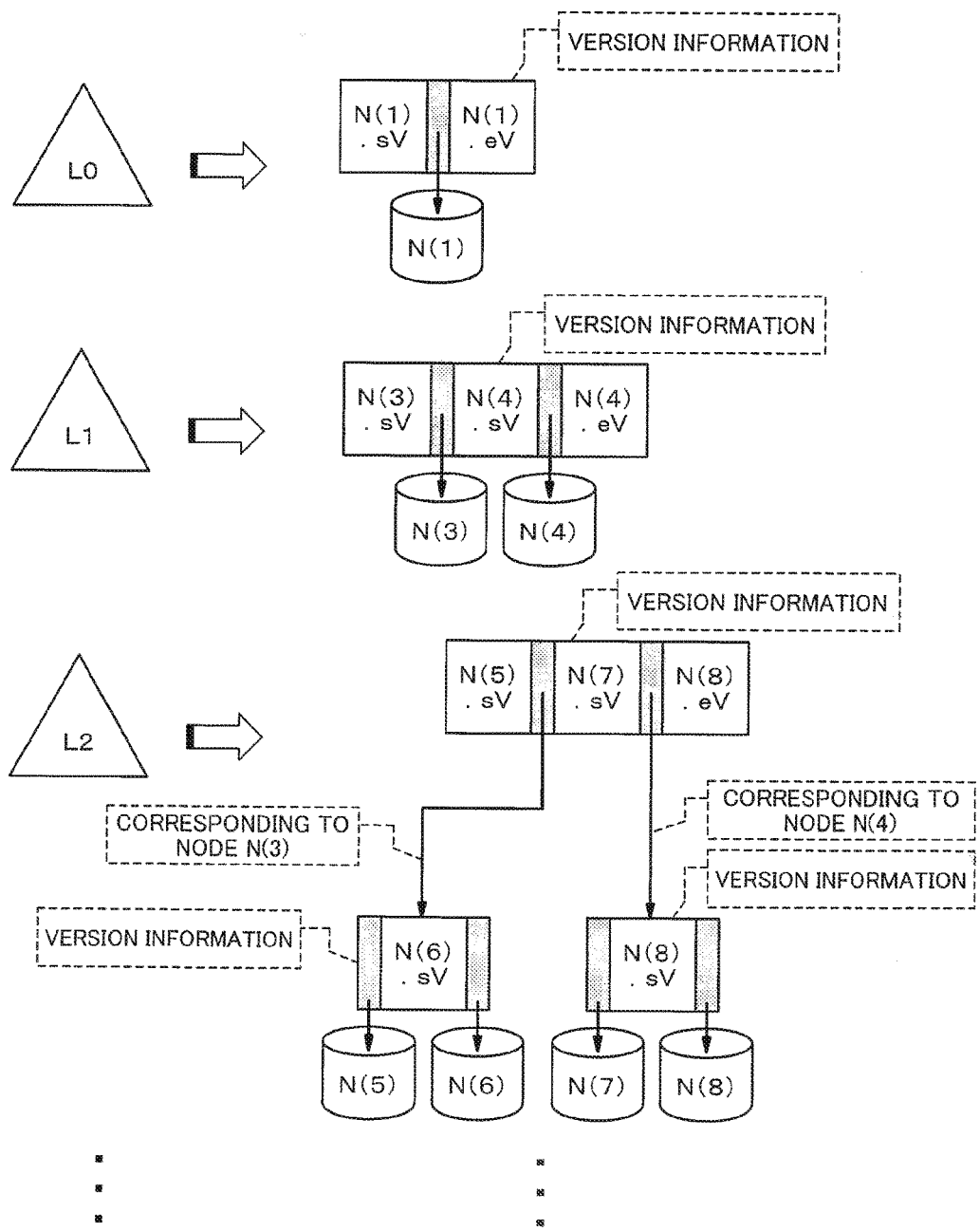
FIG. 6A is a view schematically illustrating an example of a tree structure data unit of a node N(1) based on the link examples of FIG. 3 and FIG. 4, in a management form 3.

FIG. 6A is a view schematically illustrating an example of a tree structure data unit of a node N(1) based on the link examples of FIG. 3 and FIG. 4, in the management form 3. FIG. 6B is a view schematically illustrating an example of a tree structure data unit of the node N(1) based on the link examples of FIG. 3 and FIG. 4, in the management form 6. A triangle of the left side of each of FIG. 6A and FIG. 6B indicates each layer, and a tree data unit in each layer is illustrated on the right side. An arrow of each of FIG. 6A and FIG. 6B indicates a pointer and a destination of the arrow indicates a node identification data unit. Further, N(x).sV indicates a value range start point of a node N(x) and N(x).eV indicates a value range end point of the node N(x). The examples of FIG. 6A and FIG. 6B each illustrate a tree structure data unit stored by the node N(1) and this tree structure data unit includes tree data units of three layers. FIG. 6A or FIG. 6B does not illustrate a portion where Null is set.

A tree data unit of each layer illustrated in FIG. 6A will be described below.

In a tree data unit of Layer 0, a value range start point (N(1).sV) of an own node and a value range end point (N(1).eV) of the own node, and a pointer pointing to a node identification data unit of the own node are set.

In respective entries of a tree data unit of Layer 1, the following data units are set. For a value range boundary value of a first entry, a value range start point (N(3).sV) of a node N(3) that is a link destination node is set, and for a pointer of the first entry, a pointer pointing to a node identification data unit of the node N(3) is set. For a value range boundary value of a second entry, a value range start point (N(4).sV) of a node N(4) that is a link destination node is set, and for a pointer of the second entry, a pointer pointing to a node identification data unit of the node N(4) is set. For a value range boundary value of a third entry, a value range end point (N(4).eV) of the node N(4) is set, and for a pointer of the third entry, Null is set.

A tree data unit of Layer 2 includes a root tree node and two leaf tree nodes, and the root tree node includes two pointers pointing to child tree nodes (leaf tree nodes) associated with the node N(3) and the node N(4) that are link destination nodes. The two leaf tree nodes are formed with information stored on a node N(5) to a node N(8) that are link destination nodes of the second hop from the node N(1) as the reference, in which the node N(5) to the node N(8) are linked with the node N(3) and the node N(4). In the present embodiment, a leaf tree node indicated by a pointer associated with the node N(3) is generated from the tree data unit of Layer 1 of the node N(3) and a leaf tree node indicated by a pointer associated with the node N(4) is generated from the tree data unit of Layer 1 of the node N(4). Further, in the root node of Layer 2, entries indicating value ranges of the node N(5) to the node N(8) of the second hop is set.

A tree data unit of each layer illustrated in FIG. 6B will be described below. In a tree data unit of Layer 0 of FIG. 6B, in addition to the configuration of FIG. 6A, a pointer pointing to a node identification data unit and an end point of a value range regarding a node N(2) that is a Suc node of the own node N(1) are set. In a tree data unit of Layer 1, in addition to the configuration of FIG. 6A, a pointer pointing to a node identification data unit and an end point of a value range regarding a node N(5) that is a Suc node of the last link destination node N(4) are set. In a tree data unit of Layer 2, in addition to the configuration of FIG. 6, a pointer pointing to a node identification data unit and an end point of a value range regarding a node N(9) that is a Suc node of the last link destination node N(8) of the second hop are set.

In this manner, a tree data unit of each layer is generated in a form corresponding to a management form of value range information in each node. However, there is consistency in that a tree data unit of Layer 0 is generated from value range information possessed by an own node in the value range storage unit 23, a tree data unit of Layer 1 is generated from value range information possessed by a link destination node in the value range storage unit 23, and a tree data unit of Layer L (L is at least 1) is generated from a tree data unit of Layer (L−1) of a link destination node. Further, as the layer number of a tree data unit decreases, the freshness of value range information reflected in the tree data unit increases.

Further, each tree node of each tree data unit is provided with version information. This version information is updated according to a value range change. This version information is used by the version comparison unit 16 or the like.

The data operation unit 12 acquires an object attribute and an attribute value or a range of the attribute value from determination conditions of a data unit to be operated acquired by an application program, an input from a user interface device, or the like, detects a node 11 corresponding to the attribute value or the range of the attribute value, and executes data access processing for the node 11. The corresponding node 11 is acquired from the tree search unit 13 by transmitting the object attribute and the attribute value or the range of the attribute value to the tree search unit 13. When the data access has failed, the data operation unit 12 makes an inquiry again to the tree search unit 13 about a node of the data access address.

When acquiring the object attribute and the attribute value or the range of the attribute value from the data operation unit 12, the tree search unit 13 acquires a tree structure data unit regarding a specified attribute of an arbitrary node from the tree storage unit 20, and identifies a node 11 for storing a partial data unit corresponding to the attribute value or the range of the attribute value from the tree structure data unit. When the node 11 is not identified or a tree data unit of a certain layer of the tree structure data unit is absent, the tree search unit 13 requests the tree generation unit 14 to generate a tree data unit. Detailed processing of the tree search unit 13 will be detailed in the section of Operation Examples.

The tree generation unit 14 generates a tree structure data unit as described above. When a tree data unit of Layer L (L is at least 2) in an object node 11 is generated, the tree generation unit 14 acquires a communication address of a link destination node from the link table 19 of the object node 11 and acquires a tree data unit of Layer (L−1) stored on the tree storage unit 20 of the link destination node from the link destination node using the communication address. When a tree data unit of Layer 1 in the object node 11 is generated, the tree generation unit 14 may acquire a tree data unit of Layer 0 stored on the tree storage unit 20 of the link destination node or may acquire value range information stored on the value range storage unit 23 of the link destination node. Detailed processing of the tree generation unit 14 will be detailed in the section of Operation Examples.

A value range of each attribute assigned to each node 11 is changed by a load of each node 11, a balance of a data amount stored on each node 11, or the like. On the other hand, each node 11 also manages value range information on another node by a tree structure data unit stored on the tree storage unit 20. Therefore, in spite of the fact that a value range has been changed in another node, a situation where this value range change is not reflected in the tree structure data unit of a certain node 11 is generated. In such a situation, there is a possibility that the tree search unit 13 identifies an inappropriate node 11, i.e., a node 11 that does not store a partial data unit corresponding to an attribute value of an object or a range of the attribute value.

To reduce such a situation as much as possible, the tree update unit 15 confirms, at an arbitrary timing, whether a tree structure data unit stored by each node 11 is the latest value range information, and then updates a tree data unit including old value range information with the latest value range information. Specifically, the tree update unit 15 transmits a version confirmation request where version information of a child tree node pointed to by a pointer included in a root tree node is set to a link destination node associated with the pointer, regarding a tree data unit of each layer equal to or upper than Layer 2. Using a tree data unit and version information included in a reply from the link destination node, the tree update unit 15 updates a tree data unit and version information thereof of a layer having a different version.

The tree update unit 15 desirably executes the version confirmation and the update of a tree structure data unit periodically in a predetermined cycle, asynchronously with data access processing executed by the data operation unit 12. Such a manner makes it possible to shorten a time of transmission of a value range change to all nodes and therefore, the occurrence of a situation where the tree search unit 13 identifies an inappropriate node 11 can be reduced, resulting in suppression of an increase in data access time due to this situation.

In response to a version confirmation request for a tree data unit of Layer L transmitted from another node, the version comparison unit 16 compares version information included in this version confirmation request with version information of tree data units of Layer (L−1) possessed by the node 11. The version comparison unit 16 returns a tree data unit of Layer (L−1) of a different version to the another node of the requestor, together with version information of each tree node.

Operation Examples

An operation example of the data server 10 in the first embodiment will be described below with reference to FIG. 7 to FIG. 10. In the following description, as a management form of value range information in each node, the management form 6, i.e., a form where both a start point and an end point of a value range regarding each of an own node and a Suc node are managed is employed.

FIG. 7 is a flowchart illustrating an operation example of the tree generation unit 14 in the first embodiment. When receiving a generation request where an attribute and a layer of an arbitrary node 11 (an object node 11) generation object are specified, the tree generation unit 14 identifies the attribute of the generation object (S51) and operates as follows according to the specified layer (S52).

When the specified layer is 0, the tree generation unit 14 generates respective entries of a root tree node in a tree data unit of Layer 0 of the object node 11 based on value range information stored on the value range storage unit 23. The tree generation unit 14 sets a value range start point of the object node 11 and a pointer pointing to a data unit capable of identifying the object node 11 in a first entry (S53).

Then, the tree generation unit 14 generates a second entry of the root tree node in the tree data unit of Layer 0 of the object node 11 (S54). The tree generation unit 14 sets a value range start point of a Suc node of the object node 11 and a pointer pointing to a node identification data unit of the Suc node of the object node 11 in the second entry.

Then, the tree generation unit 14 generates a third entry of the root tree node in the tree data unit of Layer 0 of the object node 11 (S55). The tree generation unit 14 sets a value range end point of the Suc node of the object node 11 and no value (Null) in the third entry.

When the specified layer is 1, the tree generation unit 14 initially refers to the link table 19 and then identifies a link destination node m of the object node 11 (S61). When a plurality of link destination nodes exists, one thereof is identified as the link destination node m. An initial value of m is 1.

The tree generation unit 14 generates an m-th entry of the root tree node in the tree data unit of Layer 1 (S62). The tree generation unit 14 sets a value range start point of the link destination node m and a pointer pointing to a node identification data unit of the link destination node m in the m-th entry. At that time, the tree generation unit 14 acquires a communication address of the link destination node m from the link table 19 and then acquires the value range start point and the node identification data unit from the link destination node m using this communication address.

The tree generation unit 14 executes both step (S61) and step (S62) described above regarding all link destination nodes (S66).

When the link destination node m is the last link destination node (S63; YES), the tree generation unit 14 generates a (m+1)th entry (S64), and further generates a (m+2)th entry (S65). Specifically, the tree generation unit 14 sets a value range end point of a link destination node m and a pointer pointing to a node identification data unit of a Suc node of the link destination node m in the (m+1)th entry (S64). Further, the tree generation unit 14 sets a value range end point of the Suc node of the link destination node m in the (m+2)th entry (S65). As described above, a value range end point of a link destination node m, a node identification data unit of a Suc node of the link destination node m, and a value range end point of the Suc node of the link destination node m are acquired from the link destination node m. The tree generation unit 14 sets no value (Null) for a pointer of the last entry.

When the specified layer is L (L is at least 2), the tree generation unit 14 identifies a link destination node m of the object node 11 in the same manner as in step (S61) described above (S56). Then, the tree generation unit 14 issues a request for a tree data unit of Layer (L−1) to the link destination node m and acquires the tree data unit of Layer (L−1) from the link destination node m according to this request (S57). Also at that time, as described above, a communication address of the link destination node m is acquired from the link table 19.

The tree generation unit 14 generates a tree node identified by a certain pointer of the root tree node of the tree data unit of Layer L and tree nodes lower than the former from the acquired tree data unit (S58). In other words, the tree generation unit 14 generates a tree node of the second stage and tree nodes lower than that based on the acquired tree data unit. When the acquired tree data unit is formed with a two-stage tree node, the tree generation unit 14 connects the two-stage tree data unit to the root tree node.

Then, the tree generation unit 14 generates an m-th entry of the root tree node of the tree data unit of Layer L (S59). The tree generation unit 14 sets a value range boundary value set in the first entry of the root tree node of the acquired tree data unit and a pointer pointing to a tree data unit generated from the root tree node of the acquired tree data unit in the m-th entry. At that time, information overlapping with a tree of an entry other than the m-th entry may be deleted as appropriate.

The tree generation unit 14 executes steps (S56), (S57), (S58), and (S59) described above for all link destination nodes (S60). Regarding the last link of the root tree node of the tree data unit of Layer L, the tree generation unit 14 sets a value range end point set in the last entry of the root tree node of the tree data unit and an entry where no value (Null) is set for the pointer.

In the example of FIG. 7, the generation step of a tree data unit of Layer 1 and the generation step of a tree data unit of Layer L (L≥2) have been expressed distinctively, but it is also possible to generate the tree data unit of Layer 1 in the same step as for the tree data unit of Layer L. In this case, in step (S52), the layer is determined to be 0 or L (L≥1), and when Layer 1 is specified, step (S56) and the following steps are executed.

FIG. 8 is a flowchart illustrating an operation example of the tree update unit 15 and the version comparison unit 16 in the first embodiment. Each node 11 (in the following description, referred to as an "object node 11") causes the tree update unit 15 to operate as follows at a predetermined timing.

The tree update unit 15 initially refers to the link table 19 and identifies a link destination node m of the object node 11 (S70). When a plurality of link destination nodes exists, one of them is identified as the link destination node m. An initial value of m is 1.

Then, the tree update unit 15 acquires version information of a tree node identified by a pointer associated with the link destination node m included on a root tree node, with respect to respective layers equal to or upper than Layer 2 of the object node 11 (S71). When a child tree node identified by the pointer is a branch tree node, it is possible to acquire version information of the child tree node and all tree nodes thereunder.

The tree update unit 15 transmits a version confirmation request including pieces of version information acquired regarding the respective layers equal to or upper than Layer 2 to the link destination node m (S72). Also at that time, as described above, a communication address of the link destination node m is acquired from the link table 19.

When receiving this version confirmation request (S81), the link destination node m causes the version comparison unit 16 to operate as follows. The version comparison unit 16 compares version information of each layer n included in the version confirmation request with version information of each layer (n−1) lower by one stage (S82). For example, version information of Layer 2 included in the version confirmation request is compared with version information of Layer 1 of the link destination node m, and version information of Layer 3 included in the version confirmation request is compared with version information of Layer 2 of the link destination node m.

As the comparison (S82) result, the version comparison unit 16 returns a tree data unit (including version information) in a layer having a different version to the object node 11, together with value range information possessed by the link destination node m (equivalent to a tree data unit of Layer 0 of the link destination node m) (S83). When the tree data unit of the layer having a different version are formed with a plurality of tree nodes, data units and version information regarding these plurality of tree nodes are returned. At that time, when Layer n included in the version confirmation request and Layer (n−1) of the link destination node m differ from each other in version, a tree data unit and version information of Layer (n−1) of the link destination node m are set for a reply, as a tree data unit and version information of Layer n.

When receiving this reply (S73), the object node 11 causes the tree update unit 15 to operate as follows. Initially, the tree update unit 15 compares a value range boundary value set in an entry corresponding to the value range information possessed by the link destination node m and the latest value range information possessed by the link destination node m included in the reply, with respect to a tree data unit of Layer 1. When these are different from each other, the tree update unit 15 updates the value range boundary value of the entry with the latest value range information and advances the version information of the tree data unit of Layer 1 (S74).

Then, the tree update unit 15 refers to the reply and determines whether a layer having a different version exists (S75).

The tree update unit 15 updates a partial tree data unit corresponding to the link destination node m in a layer having a different version of the object node 11 with a new tree data unit included in the reply (S76). When, for example, a version of Layer 2 is different, the tree update unit 15 updates a child tree node identified by a pointer corresponding to a link destination node included in a root tree node in a tree data unit of Layer 2 of the object node 11 and tree nodes lower than the child tree node with the tree data unit included in the reply. At that time, version information of each tree node following the child tree node is also updated. Further, a value range boundary value of an entry corresponding to a link destination node of the root tree node of Layer 2 is also updated.

Further, the tree update unit 15 advances version information of the root tree node of the layer having a different version (S77). The tree update unit 15 executes steps (S70) to (S77) described above for all link destination nodes (S78).

FIG. 8 described above has illustrated an example where processing is executed for respective layers equal to or upper than Layer 2 of the object node 11, but processing may be executed for respective layers equal to or upper than Layer 1. In this case, in step (S71), the tree update unit 15 acquires version information of a tree node identified by a pointer associated with the link destination node m included in the root tree node, with respect to the respective layers equal to or upper than Layer 1 of the object node 11. In step (S83), the version comparison unit 16 need not return a value range boundary value of the link destination node m or the tree update unit 15 need not execute step (S74).

FIG. 9 is a flowchart illustrating an operation example of the tree search unit 13 in the first embodiment. When acquiring an object attribute and an attribute value or a range of the attribute value from the data operation unit 12, the tree search unit 13 acquires a tree structure data unit regarding the object attribute from the tree storage unit 20 of an arbitrary node 11 (hereinafter, expressed as an object node 11) (S90). The tree search unit 13 sets an initial value of 0 for Layer L (S91). Layer 0 is the lowermost layer, and Layer L (at least 1) is a layer higher than the former.

The tree search unit 13 determines whether a tree data unit of Layer L exists in the acquired tree structure data unit (S92). When no tree data unit of Layer L exists (S92; NO), the tree search unit 13 requests the tree generation unit 14 to prepare a tree data unit of Layer L of the object node 11 (S93). In response to this request, as described above, the tree data unit of Layer L of the object node 11 is generated.

The tree search unit 13 acquires the tree data unit of Layer L (S94) and identifies a node (an address node) having the attribute value of the object attribute or a value range corresponding to the range of the attribute value from the tree data unit of Layer L (S95). Details of this identification processing for an address node will be described later with reference to FIG. 10.

When having succeeded in identifying the address node (S96; YES), the tree search unit 13 outputs information on the address node (S97). On the basis of this output information, the data operation unit 12 transfers a data access request to the address node.

On the other hand, when having failed in identifying the address node (S96; NO), the tree search unit 13 advances Layer L by one (L=L+1) (S98) and executes processing step (S92) and the following steps for Layer L having been advanced. Thereafter, the tree search unit 13 sequentially advances the layer to be searched until the address node is identified. When a plurality of virtual nodes (logical nodes 11) is provided on one data server 10 (physical server), Layer L may be advanced by one upon a failure of address node identification of all virtual nodes in one layer.

Figure 10:
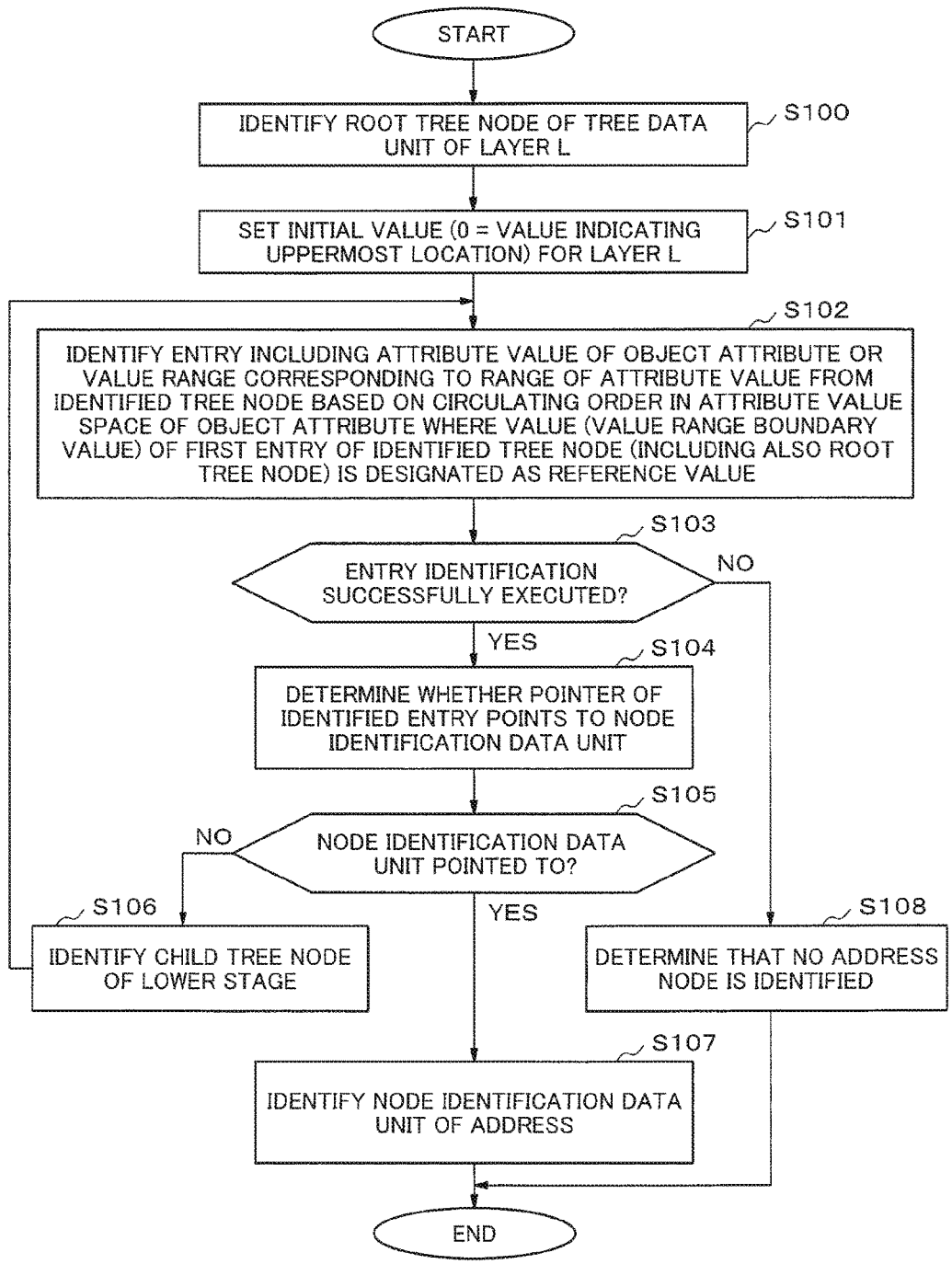
FIG. 10 is a flowchart illustrating an example of an operation for identifying an address node from a tree data unit of Layer L, in the tree search unit in the first embodiment.

FIG. 10 is a flowchart illustrating an example of an operation for identifying an address node from a tree data unit of Layer L in the tree search unit 13 in the first embodiment. In other words, FIG. 10 illustrates a detailed operation of step (S95) of FIG. 9. Initially, the tree search unit 13 identifies a root tree node of a tree data unit of Layer L (S100). Initially, for Layer L, an initial value of 0 (indicating the uppermost layer) is set (S101).

Then, the tree search unit 13 identifies an entry including an attribute value of an object attribute or a value range corresponding to a range of the attribute value from the identified tree node, based on a circulating order in an attribute value space of the object attribute where a value range boundary value of a first entry of the identified tree node (indicating a root tree node here) is designated as a reference value (S102). This circulating order corresponds to a ring structure possessed by the attribute value space correspondingly to the ID ring as described above.

When an entry is not identified from the identified tree node (S103; NO), the tree search unit 13 determines an identification failure of an address node (S108). On the other hand, when an entry has been successfully identified (S103; YES), the tree search unit 13 determines whether a pointer of the identified entry points to a node identification data unit (S104).

When a node identification data unit is pointed to (S105; YES), the tree search unit 13 acquires the node identification data unit pointed to by the pointer (S107). This processing corresponds to the identification of an address node.

When no node identification data unit is pointed to (S105; NO), i.e., when the pointer points to a child tree node, the tree search unit 13 identifies the child tree node pointed to by the pointer (S106). The tree search unit 13 executes step (S102) and the following steps for this identified tree node.

[Operations and Effects of the First Embodiment]

As described above, in the first embodiment, in response to a data access request for an attribute value of an object attribute or a range of the attribute value, the node 11 identifies an address node storing a partial data unit to which the data access request is issued, using a tree structure data unit stored on the tree storage unit 20 of the own node 11. Thereby, according to the first embodiment, a data access request can be directly transferred to an address node identified by a certain node 11 and therefore, an increase in a data access time associated with the internode transfer of the data access request can be prevented.

Further, in the first embodiment, a tree structure data unit reflected with value range information possessed by each node 11 is automatically generated from a tree data unit acquired from a link destination node of each node 11. Further, in the first embodiment, each tree node included in a tree structure data unit is provided with version information and each node 11 executes a version confirmation and an update of an own tree structure data unit using this version information in a predetermined timing in the background of data access processing. At that time, each node 11 acquires the latest tree data unit reflected with a value range change from the link destination node.

In this manner, according to the first embodiment, since value range information is transferred between the node 11 and a link destination node, an identification server group such as a metadata server and the like for centralized management of value range information need not be provided, and therefore, load concentration on the identification server group can be prevented. Further, when the identification server group is provided, it is necessary to manage the system by providing robustness therefor so that these servers do not become a single point of failure, but the configuration as described above makes it possible to reduce an amount of effort for failure countermeasures, and operation and maintenance which are given by providing the identification server group. According to the first embodiment, even when value range information generated by each node 11 individually disappears for some reason, this value range information is recoverable by being again acquired from the link destination node and therefore, it is possible to reduce also an amount of effort for failure countermeasures, and operation and maintenance regarding each node 11.

Further, in the first embodiment, each node 11 operates so as to hold value range information (a tree structure data unit) in the latest condition autonomously and separately from data access processing and therefore, an access miss where a partial data unit corresponding to an attribute value of an object or a range of the attribute value is not stored in a node 11 identified as an address node can be reduced. In other words, according to the first embodiment, when a time of transmission of a value range change to all nodes is shortened, an access miss during data access execution can be reduced and therefore, an increase in data access time can be reduced.

Further, in the first embodiment, a tree structure data unit reflected with value range information is formed so as to have the same structure as a link relationship of node IDs, and version confirmation and acquisition of value range information (a tree structure data unit) are performed between each node 11 and a link destination node thereof. Therefore, according to the first embodiment, regarding each node 11, the number of version confirmations (value range change confirmations) for a predetermined period of time is the number of links of each node 11 and therefore, a load for value range change confirmation in each node 11 can be also suppressed.

Further, in the first embodiment, it is possible that each node 11 not only executes version confirmation at every predetermined time but also updates a tree structure data unit at the time of data access execution.

The time of data access execution refers to a time when a node ID corresponding to a given key value is acquired by referring to a tree structure data unit, followed by access to a node thereof, and thereafter, the access fails due to invalidity since a value range has been already old. At that time, regarding a link corresponding to a path from a value tree node to a leaf tree node in the tree structure data unit, a tree structure can be also updated.

Second Embodiment

In the first embodiment, a construction method for a link relationship based on node IDs was not limited. In a second embodiment, as the construction method for the link relationship, a new method is applied, and adjustment processing for system parameters related thereto is added. A configuration of the distributed system 1 in the second embodiment is the same as in the first embodiment, and processing of the data server 10 differs from that in the first embodiment. The data server 10 in the second embodiment will be described below by focusing on matters different from those in the first embodiment, and description of the same matters as in the first embodiment will be omitted as appropriate.

[Device Configuration]

Figure 11:
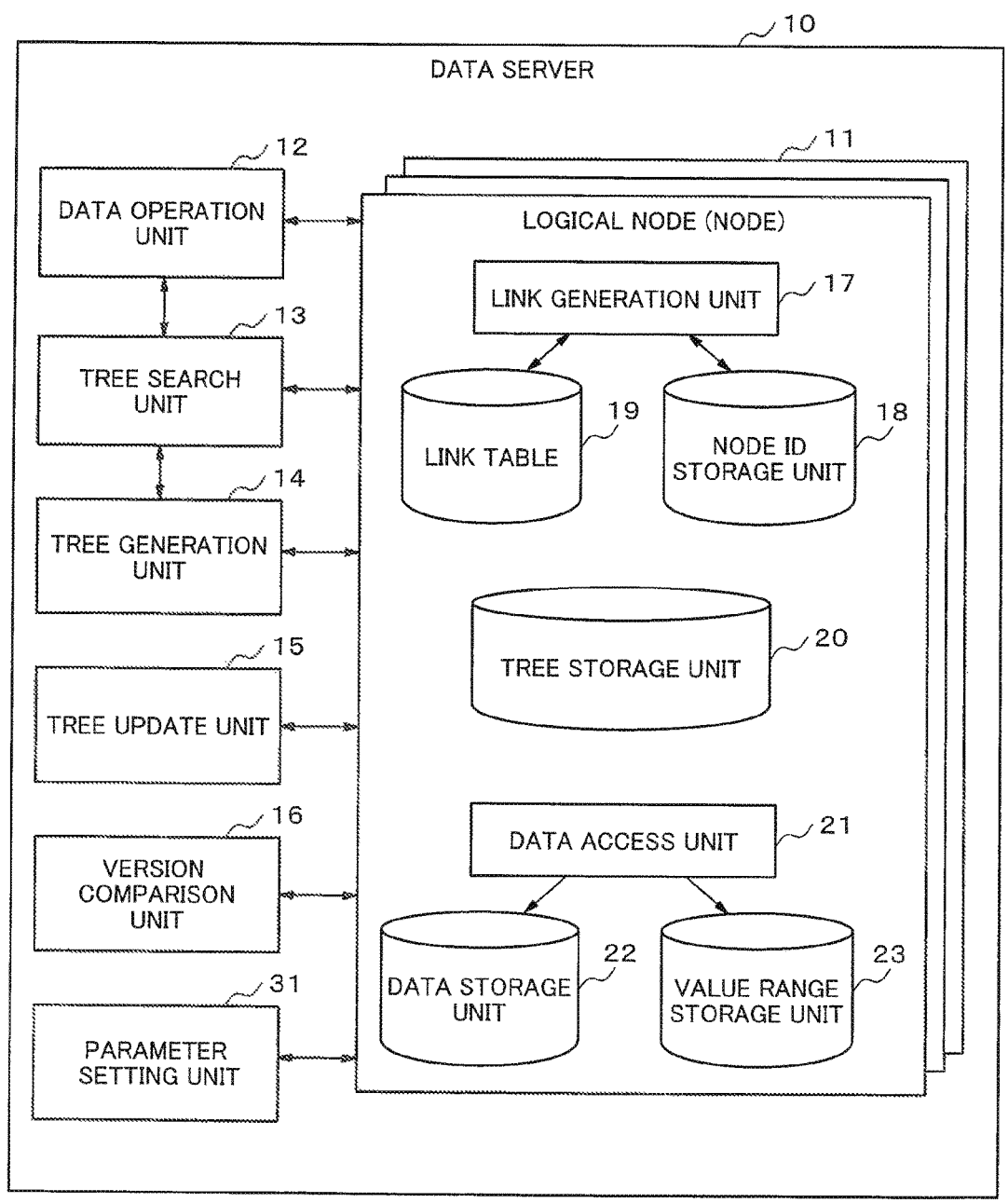
FIG. 11 is a view schematically illustrating a processing configuration example of a data server in a second embodiment.

FIG. 11 is a view schematically illustrating a processing configuration example of the data server 10 in the second embodiment. The data server 10 in the second embodiment further includes a parameter setting unit 31 in addition to the configuration of the first embodiment.

The link generation unit 17 constructs a link relationship based on node IDs using a new algorism (hereinafter, expressed as extended Koorde) and the content is reflected in the link table 19.

In well-known Koorde, each node 11 establishes links respectively with a Suc node, a Pred node for a value obtained by multiplying an ID of each node 11 by a parameter k (a natural number), and a Suc node corresponding to the (k−1)th piece from this Pred node. In well-known Koorde, the number of link destination nodes of all nodes 11 was determined by a fixed value k. In well-known Koorde, a node where an ID thereof does not exist logically as a node while being a node in a de Bruijn graph is regarded as an imaginary node, and then the imaginary node is managed by the Pred node to take an expected value of the distribution of the number of links needed. In other words, the present invention derives the distribution of the number of links needed for hopping between nodes in a de Bruijn graph, but it is interpreted that a well-known method has taken only the expected value of the distribution and the number of link destination nodes has been fixedly set to be k. Therefore, in well-known Koorde, there is a case where degrees more than necessary degrees (the number of link destination nodes) exist or degrees less than necessary degrees exist, and therefore, in the case of insufficiency, degrees have been supplemented via routing (transfer) to a Suc node. Further, independently of the manner of linking, in well-known Koorde, for shift calculation of ($\log_2$ k) bit numbers corresponding to k-ary numbers, k has been limited to an exponential power of 2.

Therefore, in extended Koorde in the second embodiment, the number (degree) of link destination nodes in each node 11 is designated as a probabilistic degree. Specifically, in extended Koorde, each node 11 establishes links respectively with a first link destination node that is a Pred node for a value obtained by multiplying an ID of the own node by a parameter k (an integer of at least 2) or the like, a second link destination node that is a Pred node for a value obtained by multiplying an ID of a Suc node of the own node by the parameter k or the like, and a link destination node present between the first link destination node and the second link destination node in an ID ring. Thereby, in extended Koorde, the number (degree) of link destination nodes determined for each node 11 becomes a probability distribution controlled by the parameter k, and a large number of nodes 11 have a degree smaller than the parameter k while a part of nodes 11 have a degree larger than the parameter k. An expected value of the degree is k+1. "The value obtained by multiplying an ID by the parameter k or the like" is an expression where the meaning of a remainder obtained by dividing (ID×k) by $2^b$ (a size of an ID space) is simplified for description convenience. Also, in other places, as an expression indicating the meaning of "a remainder obtained by dividing (ID×k) by $2^b$ (a size of an ID space)," simplification as "a value obtained by multiplying an ID by the parameter k" may be made.

The tree update unit 15 holds a value of a polling interval T and executes the version confirmation in the polling interval T. The polling interval T may be a value inversely proportional to a degree of each node or the same value over the entire system. In the inverse proportion, there is an advantage where polling loads of respective nodes are uniformed. In the case of the same value over the entire system, it becomes possible that a time from occurrence of a value range change to reflection in an original value range regarding a tree of each node can be constrained within at least a certain range.

The parameter setting unit 31 sets at least one of k or T that is a parameter so as to satisfy system requirements (constraints) for a maximum time wmax taken until a change of a value range in a certain node 11 is transmitted to all nodes 11 in the distributed system 1, a unit time load λ of version confirmation executed by each node 11, a maximum height hmax of a tree regarding tree updating during execution, or the like. The system requirements refer to setting of an upper limit constraint for a need to be at least a certain value and a minimization requirement so as to achieve a load as small as possible. Further, regarding the maximum height hmax, a communication delay and a processing time (expressed as τ0) of one hop taken per stage of a height of a tree are taken as system requirements (constraints). A delay during execution taken for updating becomes a (hmax×τ0) time and τ0 is a predetermined value. The unit time load λ represents, for example, the number of version confirmations per second executed by each node. Hereinafter, the delay taken during execution for updating will be expressed simply as an execution-time delay, and the communication delay and the processing time of one hop taken per stage of a height of a tree are expressed as an execution delay per hop.

As a setting method for the parameters k and T, respective methods as described below are conceivable. In a first parameter setting method, it is assumed that T is the same as in all nodes 11 (total node number: N) and a constraint time wc is provided for the maximum time wmax. In a second parameter setting method, T may be different in all nodes and a polling interval T per node is determined based on a constraint load λc with respect to a unit time load λ. The parameter setting unit 31 updates a value held by the tree update unit 15 in the determined polling interval T. On the other hand, in a third parameter setting method, the parameter k is determined based on a height constraint hc of a tree with respect to a maximum height hmax of the tree.

It is possible that the constraint time wc, the constraint load λc, and the height constraint hc of a tree are acquired from another device via the communication device 7, are input by an user's operation of a user interface device connected to the input/output I/F 4, or are acquired from a portable storage medium via the input/output I/F 4.

In the first parameter setting method, the parameter setting unit 31 calculates a polling interval T satisfying the following (Equation 1) using the acquired constraint time wc, a total number N of nodes 11, and a parameter k used by the link generation unit 17. Further, in the second parameter setting method, the parameter setting unit 31 calculates a polling interval T satisfying the following (Equation 2) using the acquired constraint load λc and the number (degree) D of link destination nodes of a node acquired by the link generation unit 17. In the third parameter setting method, the parameter setting unit 31 sets a parameter k by the following (Equation 3) using the acquired height constraint hc of a tree. The height constraint hc of a tree may be calculated from an execution-time delay (τ0) per hop described above and the constraint of the execution-time delay.

$$T = \frac{wc}{\log_k N} \quad \text{(Equation 1)}$$

$$T = \frac{D}{\lambda c} \quad \text{(Equation 2)}$$

$$k = N^{\frac{1}{hc}} \quad \text{(Equation 3)}$$

Hereinafter, the polling interval T has the same value in every node, or has values obtained by a distribution of polling intervals set in the above (Equation 2) when being different in the respective nodes. For example, an expected value is $(1+k)/\lambda c$. The unit time load λ and the maximum time wmax change with a polling interval T of each node λ and a parameter k. An expected value of an output degree is k+1 as described above, and therefore, the unit time load λ can be expressed as the following (Equation 4). Further, an expected value of a time w taken until a value range change reaches all nodes 11 is expressed by the following (Equation 5). The maximum time wmax can be expressed as the following (Equation 6).

$$\lambda \geq \frac{(1+k)}{T} \quad \text{(Equation 4)}$$

$$w = \frac{T}{2} \log_k N \quad \text{(Equation 5)}$$

$$wmax \geq T \log_k N \quad \text{(Equation 6)}$$

The right side of the above (Equation 5) is derived as follows. When version confirmations executed by respective nodes 11 are executed identically to and independently of each other at a certain timing and exist in ($\log_k$ N) stages, a time w taken to propagate a value range change follows an Irwin-Hall distribution that is a sum of probabilistic variables following a uniform distribution U (O,T) of ($\log_k$ N) pieces. Then, the right side of the above (Equation 5) is calculated from an expected value of the time w. As a maximum value of this distribution, the above (Equation 6) is obtained.

[Operations and Effects of the Second Embodiment]

In the second embodiment, the link generation unit 17 of each node 11 determines link destination nodes of the each node 11 using an extended Koorde algorism. In extended Koorde, as described above, the number (degree) of link destination nodes in each node 11 was probabilistically determined. Thereby, in extended Koorde, the number of links of each node 11 becomes probabilistic, while in well-known Koorde, a probabilistic element resulting from generation of a node ID via hashing has not appeared in the number (a constant) of links of each node 11 but has appeared in a usage ratio between a Suc node and a node other than the Suc node.

Therefore, in the second embodiment using extended Koorde, when a plurality of virtual nodes (logical nodes 11) is set specifically in the same data server 10, there exist a node 11 having a large link number and a node 11 having a small link number in one data server 10 and therefore, loads of version confirmation of tree structure data units of respective nodes 11 become different. However, when each data server 10 is caused to achieve a predetermined number of nodes 11, it becomes highly possible that the same data server 10 achieves a node 11 having a large link number and a node 11 having a small link number, and as a result, a version confirmation load of each data server 10 can be substantially constant.

Further, in well-known Koorde, a number (a degree, specifically an output degree) where one node is linked to other nodes has been constant but a number (an input degree) where one node is linked from other nodes has been probabilistic and variable. Although in extended Koorde, this variation exists, the variation is smaller than that in well-known Koorde and load dispersion is likely to be made. In the case of a variation in output degree, as described in the second parameter setting method, it is possible to achieve load uniformity by considering another factor such as a polling interval T and the like. However, with respect to the input degree that is "a number due to being linked," it is difficult to achieve load uniformity as described above and therefore, as seen in extended Koorde, a small variation in degree is a desirable property.

Further, in the second embodiment, since according to a link relationship determined by extended Koorde, tree data units of layers equal to or upper than Layer 1 are generated, a transmission destination of a version confirmation request can be assigned only to a link destination node by excluding a Suc node and a tree structure data unit reflected with value range information can be easily managed. In other words, a tree structure where a pass to a node group of the h-th hop from each node is balanced can be produced.

Further, in the second embodiment, when a maximum transmission time wmax of a value range change and system requirements (constraints) such as a constraint time τc and a constraint load λc for a unit time load λ of version confirmation are provided, a polling interval T for achieving these is determined and in the polling interval T, each node 11 executes version confirmation of a tree structure data unit, i.e., value range change confirmation. Therefore, according to the second embodiment, version confirmation processing of value range information in each node 11 makes it possible to prevent occurrence of an unexpected load.

Third Embodiment

In the respective embodiments described above, each data server 10 achieving a node 11 storing partial data units executed processing as described above, but a device that does not achieve a node 11 without storing partial data units may execute processing as described above. The distributed system 1 in the third embodiment further includes a data operation client 50 as a device that does not achieve a node 11 without storing partial data units. The distributed system 1 of the third embodiment will be described below by focusing on matters different from those in the first embodiment, and description of the same matters as in the first embodiment will be omitted as appropriate.

[System Configuration]

Figure 12:
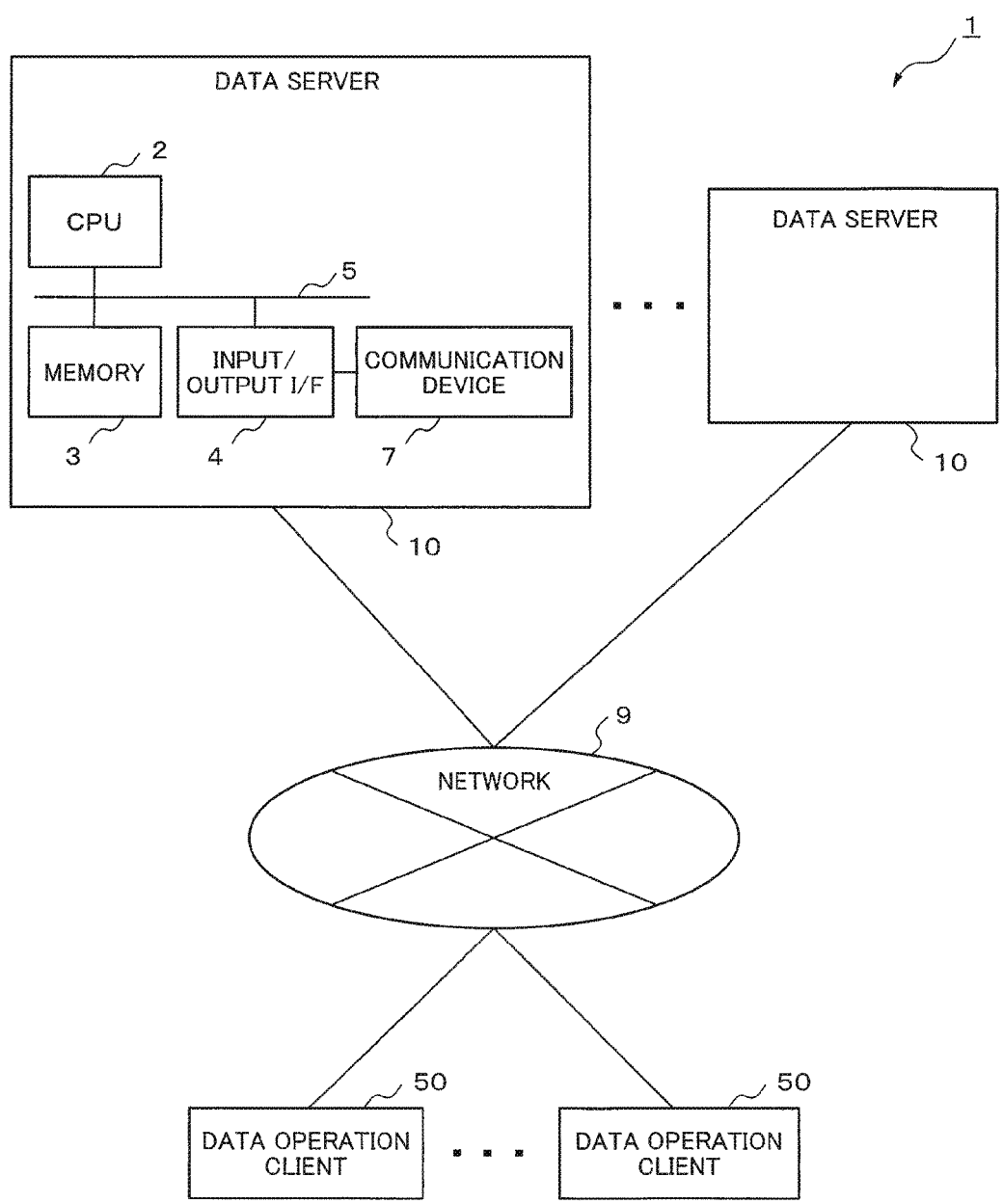
FIG. 12 is a view schematically illustrating a configuration example of a distributed system in a third embodiment.

FIG. 12 is a view schematically illustrating a configuration example of the distributed system 1 in the third embodiment. The distributed system 1 of the third embodiment further includes a plurality of data operation clients (hereinafter, also expressed simply as clients) 50, in addition to the configuration of the first embodiment. The clients 50 are communicably connected to the data server 10 via the network 9. In the same manner as the data server 10, according to an application or a request from another terminal, the client 50 accesses data units stored on the data server 10 to acquire a desired data unit. A hardware configuration of the client 50 is also the same as the data server 10 and the present embodiment does not limit the hardware configuration of the client 50.

[Device Configuration]

Figure 13:
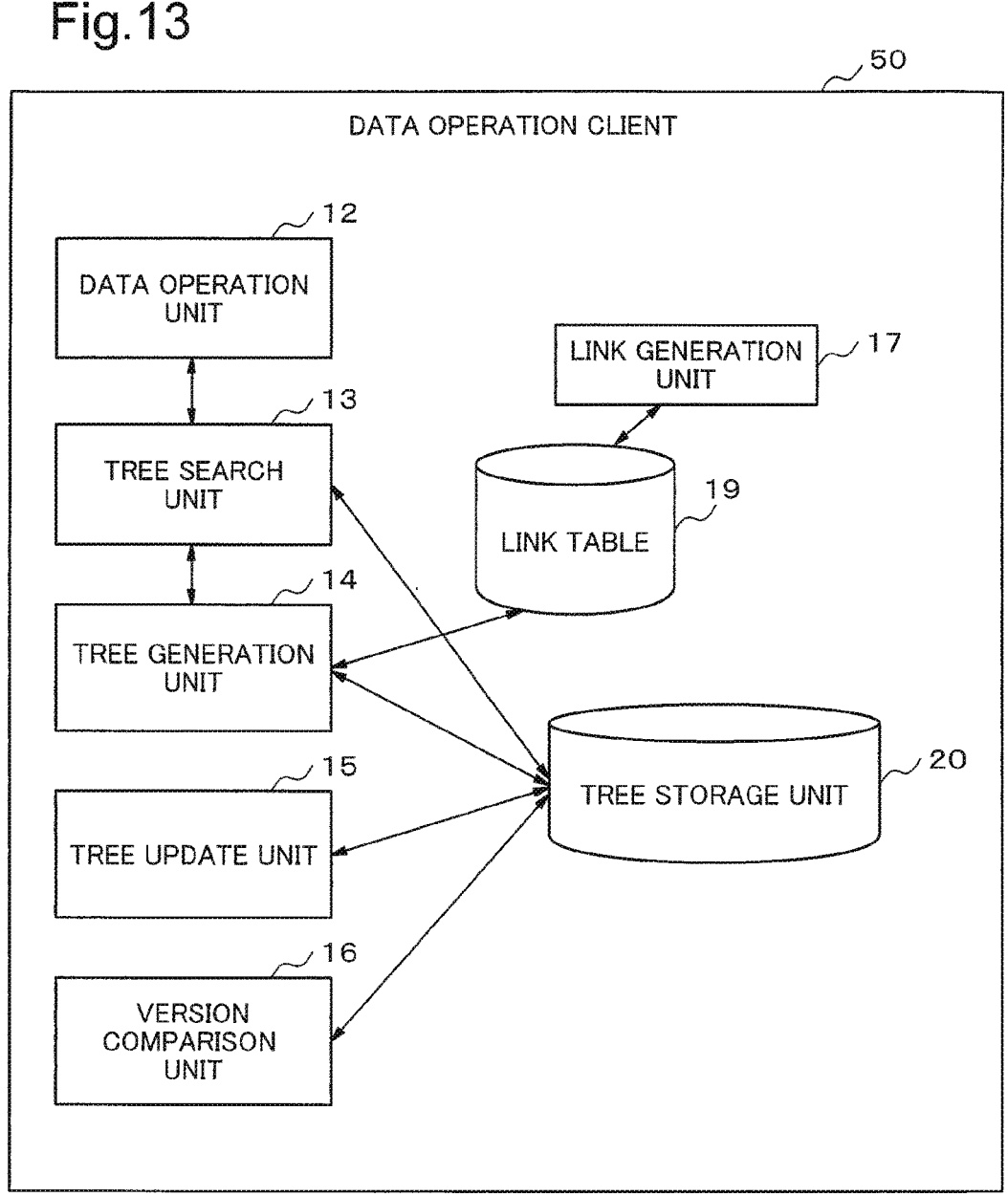
FIG. 13 is a view schematically illustrating a processing configuration example of a data operation client in the third embodiment.

FIG. 13 is a view schematically illustrating a processing configuration example of the data operation client 50 in the third embodiment. As illustrated in FIG. 13, the client 50 includes a data operation unit 12, a tree search unit 13, a tree generation unit 14, a tree update unit 15, a version comparison unit 16, a link generation unit 17, a link table 19, and a tree storage unit 20. These processing units are basically the same as in the first embodiment.

The link generation unit 17 constructs a link relationship between at least one arbitrary node 11 among a plurality of nodes 11 achieved by a plurality of data servers 10 and the client 50, and reflects this link relationship in the link table 19. All nodes hold value ranges regarding all other nodes and therefore, the client 50 may have a link relationship of only a single arbitrary node. The client 50 does not participate in an ID space constructed by node IDs of respective nodes 11, i.e., is not an object voluntarily accessed from the nodes 11 and therefore, a construction method of a link relationship in the client 50 is not specifically limited.

A tree structure data unit stored on the tree storage unit 20 includes no tree data unit of Layer 0, since the client 50 has no adjacent node in an ID ring. Tree data units of respective layers equal to or upper than Layer 1 are the same as in the first embodiment. Thereby, the tree generation unit 14 becomes the same as in the first embodiment, excluding no generation of a tree data unit of Layer 0.

[Operations and Effects of the Third Embodiment]

In this manner, in the third embodiment, in the client 50 that does not achieve a node 11 without storing partial data units, the same processing as in the first embodiment is executed. Therefore, also when the client 50 in the third embodiment acquires a data access request, the same operations and effects as in the first embodiment can be achieved.

The above respective embodiments will be further described in detail by citing examples below. The present invention is not specifically limited by the following examples.

Example 1

A form example where extended Koorde is used in the distributed system 1 of the first embodiment will be described below as Example 1. In Example 1, a finite range possessed by an ID space of node IDs is [0,1024) and in the distributed system 1, nine nodes 11 are achieved. Further, for simple description, processing only for one attribute is described. Hereinafter, a node having a certain ID value is expressed as a node (ID value).

Figure 14:
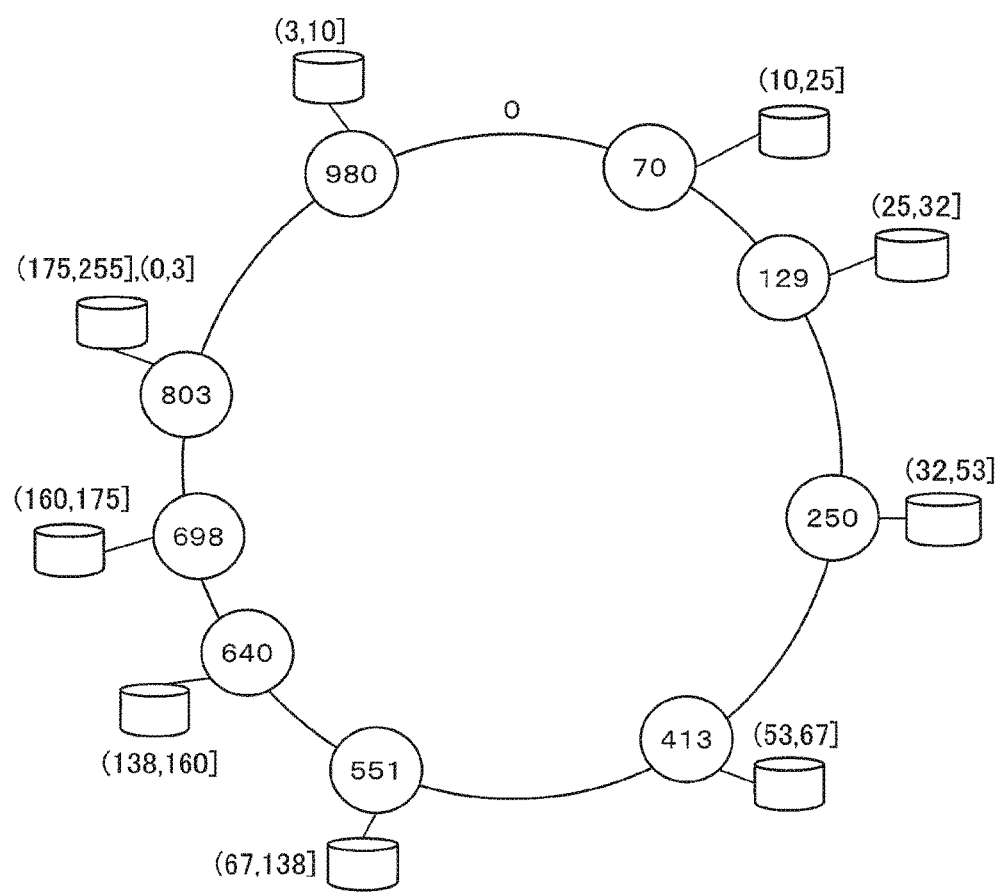
FIG. 14 is a view schematically illustrating a relationship between an ID ring and value range information in Example 1.

FIG. 14 is a view schematically illustrating a relationship between an ID ring and value range information in Example 1. According to the example of FIG. 14, a node (70) has a value range of (10,25] and a node (803) has value ranges of (175,255] and (0,3].

The link generation unit 17 of each node 11 determines link destination nodes of the own node 11 by an extended Koorde algorism. In Example 1, a parameter k used in the extended Koorde algorism is set to be 2.

Figure 15:
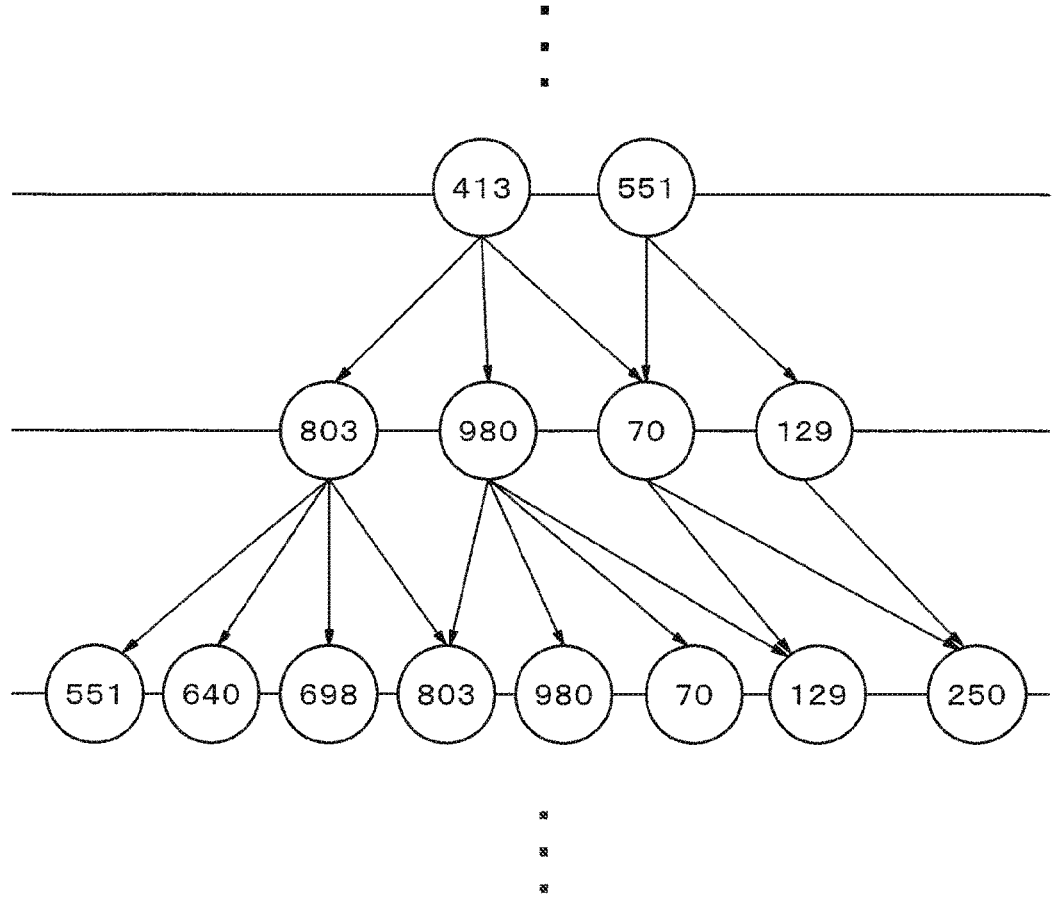
FIG. 15 is a view illustrating a part of a link relationship generated in Example 1.

FIG. 15 is a view illustrating a part of a link relationship generated in Example 1. A node (413) establishes links with a node (803) as a first link destination node as described above, a node (70) as a second link destination node as described above, and a node (980) as a third link destination node as described above present between these nodes in an ID ring. The node (803) is a Pred node for a value (826) obtained by multiplying an ID (413) of the node (413) by a parameter k (2). The node (70) is a Pred node for a value (78=1102−1024) obtained by multiplying an ID (551) of a Suc node (551) of the node (413) by the parameter k (2).

The node (803) has links with respective nodes from the node (551) to the node (803). The node (551) is a Pred node for a value (582=1606−1024) obtained by multiplying an ID (803) of the node (803) by the parameter k (2). The node (803) is a Pred node for a value (936=1960−1024) obtained by multiplying an ID (980) of a Suc node (980) of the node (803) by the parameter k (2). The node (803) as the second link destination node is the own node and therefore, link information thereof is not stored. The node (551) establishes links with the node (70) and a node (129). Further, the node (70) establishes links with the node (129) and a node (250).

According to such a link relationship, the node (551) reaches the node (250) from the node (70) by two hops. Such a link relationship is generated by the link generation unit 17 of each node 11 and then stored on the link table 19 of each node 11.

Assuming that while such a link relationship is constructed, the data operation unit 12 acquires a data access request for an attribute value (35) of an object attribute, operations of the tree search unit 13 and the tree generation unit 14 in Example 1 will be described below with reference to the flowcharts of FIG. 7, FIG. 9, and FIG. 10. It is assumed that at that time, the data operation unit 12 instructs the tree search unit 13 to identify a node 11 for storing a partial data unit including the attribute value (35) in which the node (413) is designated as an object node.

The tree search unit 13 acquires the attribute value (35) of an object attribute (S90), sets an initial value of 0 for Layer L (S91), and determines whether a tree data unit of Layer 0 exists (S92). Since no tree data unit of Layer 0 exists (S92;

NO), the tree search unit 13 requests the tree generation unit 14 to generate the tree data unit of Layer 0 of the node (413) (S93).

In Example 1, as a management form of value range information in each node, the management form 6, i.e., a form where both a start point and an end point of a value range regarding each of an own node and a Suc node are managed is employed. Therefore, at that time, the node (413) has, in the value range storage unit 23, a start point (53) and an end point (67) of a value range of the own node (413) and a start point (67) and an end point (138) of the Suc node (551).

The tree generation unit 14 generates a tree data unit of Layer 0 as described below, based on the value range start point (53) and the value range end point (67) of the own node (413) and the value range start point (67) and the value range end point (138) of the Suc node (551) (S53).

First entry: value range boundary value (53), a pointer regarding the node (413)
Second entry: value range boundary value (67), a pointer regarding the node (551)
Third entry: value range boundary value (138), Null The tree search unit 13 tries to identify an address node having a value range including an attribute value (35) from this tree data unit of Layer 0 (S95). However, the value range indicated by the tree data unit of Layer 0 is (53,138] and therefore, the attribute value (35) is not included. Therefore, since being unable to identify the address node by the tree data unit of Layer 0 (S96; NO), the tree search unit 13 advances Layer L to be searched by one stage (S98).

Since no tree data unit of Layer 1 exists (S92; NO), the tree search unit 13 requests the tree generation unit 14 to generate the tree data unit of Layer 1 of the node (413) (S93). The tree generation unit 14 generates a tree data unit of Layer 1 as described below, based on a value range start point (175) of the link destination node (803), a value range start point (3) of the link destination node (980), a value range start point (10) and a value range end point (25) of the link destination node (70), and a value range end point (32) of the Suc node (129) of the link destination node (70) (S62).

First entry: value range boundary value (175), a pointer regarding the node (803)
Second entry: value range boundary value (3), a pointer regarding the node (980)
Third entry: value range boundary value (10), a pointer regarding the node (70)
Fourth entry: value range boundary value (25), a pointer regarding the node (129)
Fifth entry: value range boundary value (32), Null The tree search unit 13 tries to identify an address node having a value range including the attribute value (35) from this tree data unit of Layer 1 (S95). However, the value range indicated by the tree data unit of Layer 1 is (175,32] and therefore, the attribute value (35) is not included. Therefore, since being unable to identify the address node by the tree data unit of Layer 1 (S96; NO), the tree search unit 13 advances Layer L to be searched by one stage (S98).

Since no tree data unit of Layer 2 exists (S92; NO), the tree search unit 13 requests the tree generation unit 14 to generate the tree data unit of Layer 2 of the node (413) (S93). The tree generation unit 14 acquires a tree data unit of Layer 1 from each of the link destination nodes (803, 980, and 70) (S57) and generates a tree data unit of Layer 2 based on the acquired tree data unit (S58 and S59). Thereby, a root tree node of the tree data unit of Layer 2 is generated as follows.

First entry: value range boundary value (67), a pointer pointing to a child tree node (corresponding to the link destination node (803))
Second entry: value range boundary value (175), a pointer pointing to a child tree node (corresponding to the link destination node (980))
Third entry: value range boundary value (25), a pointer pointing to a child tree node (corresponding to the link destination node (70))
Fourth entry: value range boundary value (67), Null A value range (67,67] indicated by the root tree node of the tree data unit of Layer 2 covers the entire value range and therefore includes the attribute value (53). This inclusion determination is a circulating order where 67 is designated as a reference and (67,67] is regarded as (67,255] U [0,67] including the attribute value (35). Further, the tree search unit 13 identifies an entry where (32,53] is a value range, follows a pointer of the entry, and identifies a pointer pointing to a node identification data unit of the node (250) in a tree node lower than the root tree node by one stage (S107).

Figure 16:
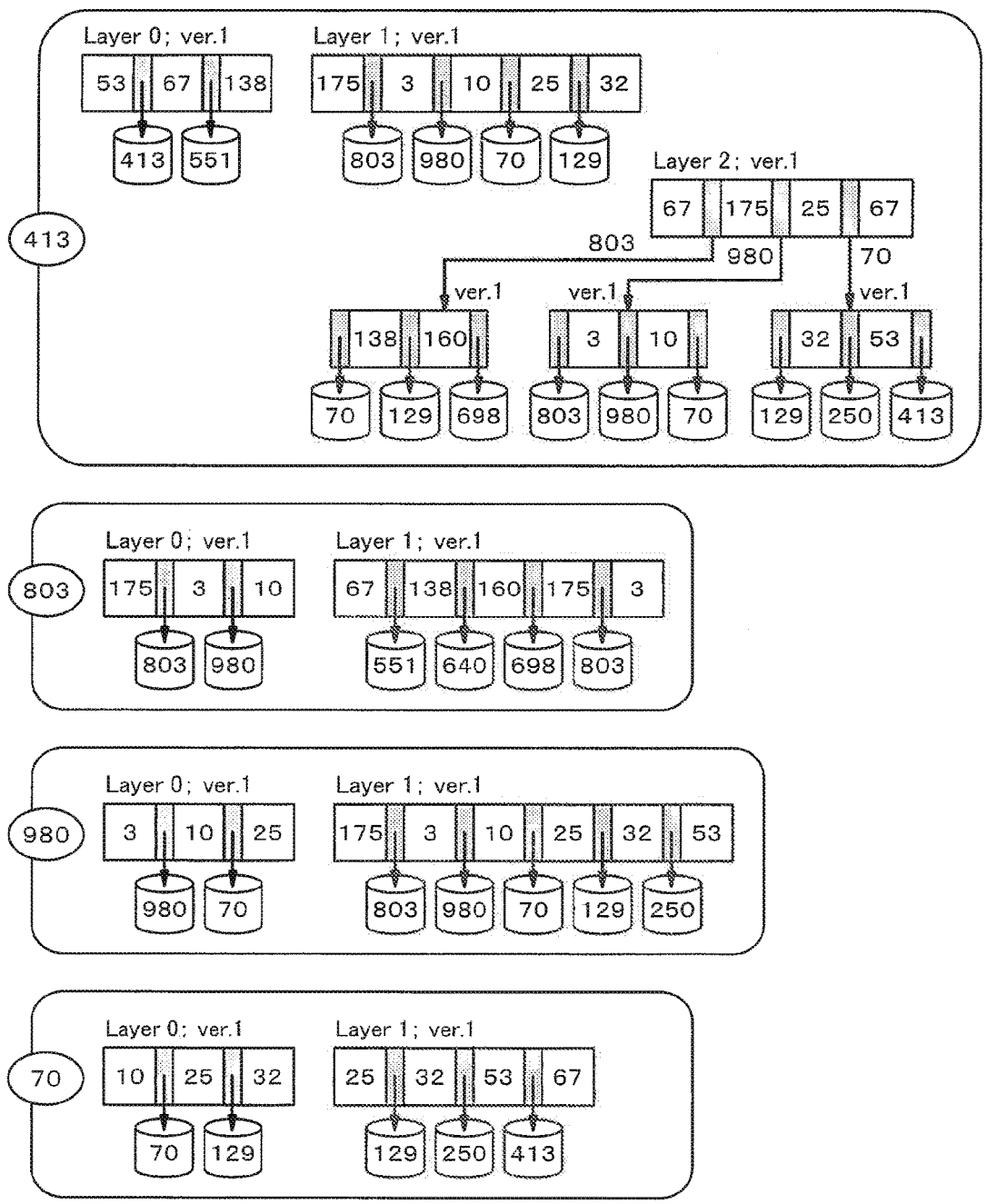
FIG. 16 is a view illustrating a part of a tree structure data unit generated by each node 11 in Example 1.

Thereby, the data operation unit 12 acquires a communication address of the node (250) based on the node identification data unit of the node (250) acquired from the tree search unit 13 and executes data access processing of the attribute value (35) for the node (250) using this communication address. A tree structure data unit generated in such a manner is illustrated in FIG. 16. FIG. 16 is a view illustrating a part of a tree structure data unit generated by each node 11 in Example 1.

Figure 17:
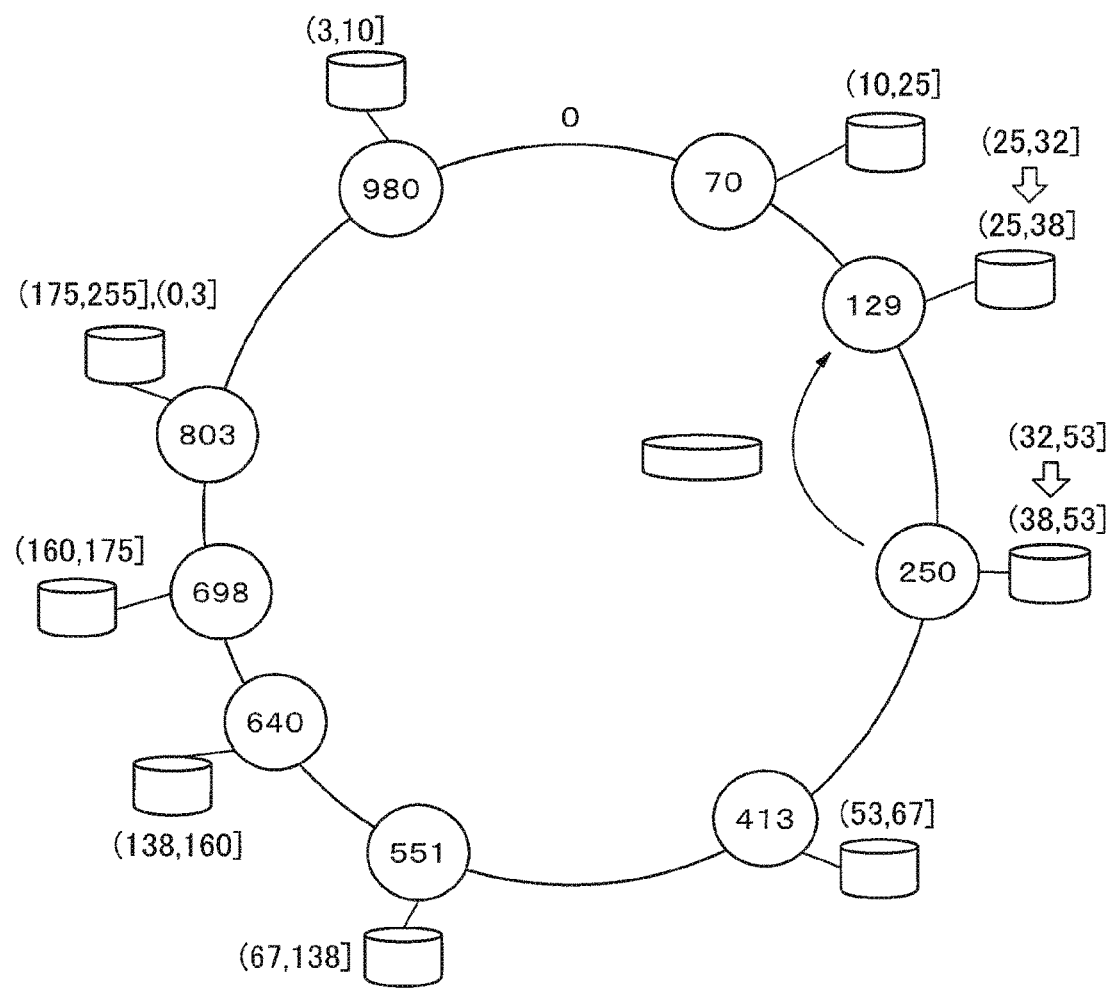
FIG. 17 is a view schematically illustrating an example of load dispersion in Example 1.

Next, an operation example of the tree update unit 15 and the version comparison unit 16 in Example 1 will be described with reference to FIG. 8. It is assumed that load dispersion is made between the node (250) and the node (129) and as illustrated in FIG. 17, a value range change is performed. FIG. 17 is a view schematically illustrating an example of load dispersion in Example 1. Via this load dispersion, the node (129) stores a partial data unit having a value range (25,38] and the node (250) stores a partial data unit having a value range (38,53]. A load in this load dispersion may be a data storage amount or a data access frequency. Further, it is possible that a load with respect to each data server 10 is used as an indicator and then a load with respect to each logical node 11 is uniformed.

In this case, an example where an object to be processed of the tree update unit 15 and the version comparison unit 16 is the node (413) is cited. It is assumed that at that time, the node (413) includes a tree structure data unit as illustrated in FIG. 16. The tree update unit 15 executes the following version confirmation processing at a predetermined timing.

Initially, the tree update unit 15 refers to the link table 19 of the node (413), recognizes link destination nodes (803, 980, 70) of the node (413), and identifies the link destination node (803) that is one of these (S70). Then, the tree update unit 15 acquires version information (version 1 (ver. 1)) of a tree node identified by a pointer corresponding to the link destination node (803) set in the root tree node of Layer 2 in the tree structure data unit of the node (413) (S71). The tree update unit 15 transmits a version confirmation request including the version information (version 1) of Layer 2 to the link destination node (803) (S72).

When the link destination node (803) receives the version confirmation request (S81), the version comparison unit 16 compares the version information (version 1) of Layer 2 included in the request and version information (version 1) of Layer 1 of the link destination node (803) (S82). In this case, the versions are identical. Then, the version comparison unit 16 transmits a reply including value range information possessed by the link destination node (803) (S83). According to the value range information management form (the management form 6) of each node in Example 1, as the value range information possessed by the link destination node (803), a value range start point (175) of the link destination node (803) and a value range start point (3) and a value range end point (10) of the Suc node (980) of the link destination node (803) are returned.

When receiving the reply (S73), the tree update unit 15 compares value range boundary values (175, 3, and 10) set in a first entry to a third entry corresponding to the value range information possessed by the link destination node (803) in the tree data unit of Layer 1 of the node (413) and the latest value range information (175, 3, and 10) possessed by the link destination node (803) included in the reply. In this case, it is determined that both are identical and no value range change is made.

Then, the tree update unit 15 refers to the reply to determine whether a layer having a different version exists (S75). In this case, no layer having a different version exists (S75; NO) and therefore, the tree update unit 15 identifies the next link destination node (980) (S70). At that time, it is assumed that the node (980) includes a tree structure data unit as illustrated in FIG. 18.

Figure 18:
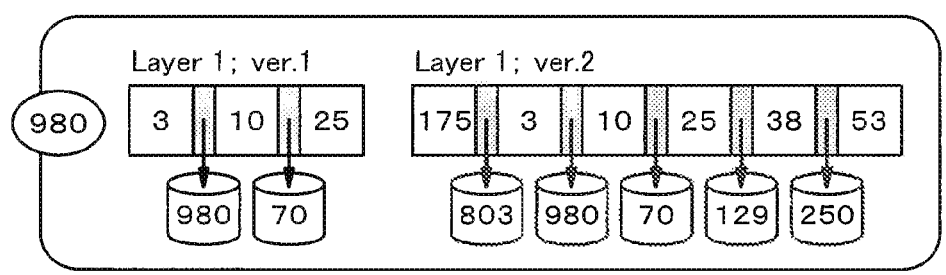
FIG. 18 is a view schematically illustrating an example of a tree structure data unit of a node (980) after load dispersion in Example 1.

FIG. 18 is a view schematically illustrating an example of a tree structure data unit of the node (980) after load dispersion in Example 1. In other words, a value range boundary value of the link destination node (129) of the node (980) has been changed and therefore, version information of the tree data unit of Layer 1 of the node (980) has been advanced to 2.

The tree update unit 15 also executes the same processing (S71) for the link destination node (980) and transmits a version confirmation request including the version information (version 1) of Layer 2 to the link destination node (980) (S72).

When the link destination node (980) receives the version confirmation request (S81), the version comparison unit 16 compares the version information (version 1) of Layer 2 included in the request and version information (version 2) of Layer 1 of the link destination node (980) (S82). In this case, the versions are different from each other and therefore, the version comparison unit 16 transmits a reply including the tree data unit (including the version information) of Layer 1 of the link destination node (980) and value range information (3, 10, and 25) possessed by the link destination node (980) (S83).

When receiving the reply (S73), the tree update unit 15 compares value range boundary values (3, 10, and 25) set in a second entry to a fourth entry corresponding to the value range information possessed by the link destination node (980) in the tree data unit of Layer 1 of the node (413) and the latest value range information (3, 10, and 25) possessed by the link destination node (980) included in the reply. In this case, it is determined that both are identical and no value range change is made.

Then, the tree update unit 15 determines that the version of Layer 2 is different based on the reply (S75; YES) and updates a tree node identified by a pointer corresponding to the link destination node (980) included in the root tree node of Layer 2 with the tree data unit of Layer 1 of the link destination node (980) included in the reply (S76). Thereby, the version information of the tree node identified by the pointer becomes 2. The updating may be duplication of a tree data unit included in the reply or a manner in which value range boundary value information in a tree data unit included in the reply is omitted in relation to a value range boundary value set in the root tree node.

Further, the tree update unit 15 sets the acquired value range boundary value (175) of the first entry of the tree data unit of Layer 1 of the link destination node (980) as a value range boundary value of an entry including a pointer associated with the link destination node (980) in the tree data unit of Layer 2 of the node (413), and then advances the version information of the root tree node of Layer 2 (S77). Then, the tree update unit 15 identifies the next link destination node (70) (S70). Thereafter, the same version confirmation processing is executed also for the link destination node (70).

Figure 19:
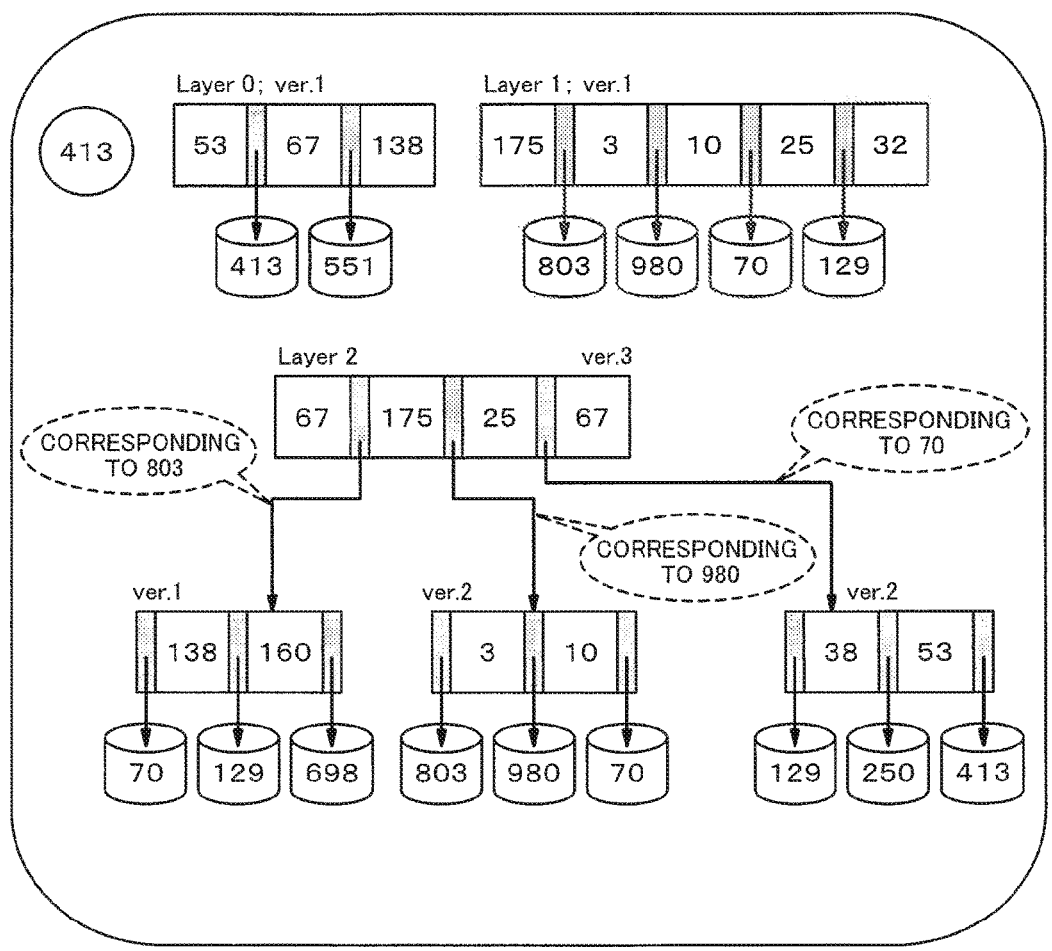
FIG. 19 is a view schematically illustrating an example of a tree structure data unit after a version update of a node (413) in Example 1.

FIG. 19 is a view schematically illustrating an example of a tree structure data unit after a version update of the node (413) in Example 1. As illustrated in FIG. 19, regarding a tree data unit of Layer 2, version information (Ver. 3) of the root tree node, version information (Ver. 2) of a child tree node identified by a pointer associated with the link destination node (980), version information (Ver. 2) of a child tree node identified by a pointer associated with the link destination node (70), and a value range boundary value (38) each have been updated. Further, the same processing is executed also for nodes, other than the node (413), having a link to the node (980) and then new value range information is acquired for each of the nodes.

In the tree data units acquired from the link destination node (980) and the tree data units acquired from the link destination node (70), overlapping entries (three entries including value range boundary values (25, 38, and 53)) exist and therefore, in the example of FIG. 19, the overlapping entries are eliminated from the child tree node identified by the pointer associated with the link destination node (980). Tree nodes other than the root tree node of tree data units of layers equal to or upper than Layer 2 may be duplicates of tree data units included in a reply or may be ones modified from the tree data units to eliminate redundancy in such a manner. When redundancy among branch (leaf) tree nodes is eliminated in this manner, it is desirable to associate version management with difference management among tree nodes. In the above example, in an entry eliminated due to redundancy, a value range boundary value has been changed and version information of a child tree node identified by the pointer associated with the link destination node (980) has been advanced. However, regarding an update for an entry eliminated due to redundancy (a place overlapping with an own Suc node), version information need not be advanced.

Next, as Example 2, extended Koorde and parameters used in the second embodiment will be described.

Example 2

An indegree, an outdegree, and a height (or a hop number) of a tree to be constructed in extended Koorde strongly depend on a probabilistic variable regarding a distance to a Suc node of each node. When the number of virtual servers (the number of logical nodes 11) with respect to one physical server (one data server 10) is designated as v and the total number of logical nodes 11 is designated as N, a probabilistic variable corresponding to a distance to an adjacent node follows a geometric distribution and the sum of the virtual server fractions v follows a negative binomial distribution NB (v,p). Further, the number of nodes included in a given range x follows a binomial distribution B (x,p).

Here, p is $N/2^b$. An outdegree ($\delta_{OUT}$) and an indegree ($\delta_{IN}$) are given by the following (Equation X1) and (Equation X2).

$$\delta_{OUT} - v \sim \sum_{r \in [1,2^b]} B(kr, p)NB(r; v, p) \quad \text{(Equation X1)}$$

$$\delta_{IN} - kv \sim \sum_{r \in [1,2^b]} B(r, p)NB(r; v, p) \quad \text{(Equation X2)}$$

$$\overline{h}_{max} \sim \sum_{r \in [f(h+1), f(h)]} G(r, p) \quad \text{(Equation X3)}$$

Regarding layers of a tree, a distribution of upper limits of highest tree heights hmax in respective nodes is easily determined. When a range of IDs covered by a node group of the h-th hop is designated as rh, hmax is a minimum height (h) satisfying $rh > 2^b$. Upon designating a distance between a node and a Suc node as r, since rh is wider than $rk^h$, hmax is at most a minimum value of h where at least $rkh > 2^b$ is satisfied and this value becomes an upper limit of hmax. When $f(h) = 2^b/k^h$ is satisfied, a probabilistic distribution of this upper limit is given by the above (Equation X3).

It is thought that a constraint (constraint time wc) of a maximum time wmax until a change of a value range in a given node 11 is transmitted to all nodes 11 in the distributed system 1; an upper constraint of an execution-time delay are set; and then a unit time load λ of version confirmation executed by each node 11 is minimized. In this case, optimization is executed based on Lagrange Multiplier Method. When Lagrange multipliers are designated as $\lambda_1$ and $\lambda_2$, KKT (Karush-Kuhn-Tucker) conditions include $\lambda_1 \geq 0$, $(wc - T \log_k N) \geq 0$, and $\lambda_1(wc - T \log_k N) = 0$, as well as $\lambda_2 \geq 0$, $(hc - \log_k N) \geq 0$, and $\lambda_2(hc - \log_k N) = 0$. Here, hc is a height constraint hc of a tree as described above. These conditions are used as constraints, and then a Lagrange function of the following (Equation X4) is minimized.

$$L(T, k, \lambda_1, \lambda_2) = \frac{1+k}{T} - \lambda_1(wc - T \log_k N) - \lambda_2(hc - \log_k N) \quad \text{(Equation X4)}$$

When the above (Equation X4) is differentiated partially with respect to a polling interval T, the following (Equation X5) is obtained.

$$\frac{\partial L(T, k)}{\partial T} = -\frac{1+k}{T^2} + \frac{\lambda_1 \log_e N}{\log_e k} \quad \text{(Equation X5)}$$

When $\lambda_1 = 0$ is satisfied, $T > 0$ and $k < 0$ make the unit time load λ minimum at $T \to \infty$ but therefor, the constraint time wc needs to satisfy $wc < \infty$, resulting in unreality. Therefore, $wc = T \log_k N$ is satisfied from the KKT conditions. At an optimum point, the above (Equation X5) gives 0 and therefore, the following (Equation X6) is obtained.

$$\frac{\lambda_1 T \log_e N}{\log_e k} = \frac{1+k}{T} \quad \text{(Equation X6)}$$

On the other hand, when the above (Equation X4) is differentiated partially with respect to k and the above (Equation X6) is used, the following (Equation X7) is obtained.

$$\frac{\partial L(T, k)}{\partial k} = \frac{1}{T} - \frac{\lambda_1 T \log_e N}{k \log_e^2 k} - \frac{\lambda_2 \log_e N}{k \log_e^2 k} \quad \text{(Equation X7)}$$

$$= \frac{1}{T} - \frac{1+k}{kT \log_e k} - \frac{\lambda_2 \log_e N}{k \log_e^2 k} \quad \text{(Equation X8)}$$

The case of $(hc - \log_k N) > 0$ is considered (expressed as condition (i). At that time, from the KKT conditions, $\lambda_2 = 0$; k allowing the above (Equation X8) to be zero is k* satisfying $\log_e k = (1+k)/k$; and $k^* = 3.59 \ldots$. When this value of k is used, condition (i) corresponds to the case of satisfying $hc > 0.78 \log_e N$. For example, in the case of $N = 1000$, hc set corresponds to the case of about at least 5.4. At that time, the polling interval T is set by the following (Equation X9).

$$T = \frac{wc(1+k^*)}{k^* \log_e N} = \frac{1.28 wc}{\log_e N} \quad \text{(Equation X9)}$$

In cases other than the above condition (i), $hc = \log_k N$ is satisfied and therefore, the parameter k is determined by a (1/hc) power of N and the polling interval T is determined by T=wc/hc. Due to corresponding to the two-bit shift in a de Bruijn graph, k* is preferably set to be k=4 for convenience.

It is possible that when constructing links, each node 11 may be linked with nodes at least from a pred node (km) to a pred node (km+kρ) using a height constraint hc2 of a given tree. The symbol ρ is represented by the following (Equation X10). Such a manner makes it possible to control an upper limit (diameter) of the number of hops among all nodes at hc2 or less. The symbol km is an expression where "km mod $2^b$" is simplified.

$$\rho = \frac{2^b}{k^{hc2}} \quad \text{(Equation X10)}$$

Modified Example

In version confirmation processing in the embodiments and the modified examples described above, version information was compared on a link destination node side of an object node (S82 of FIG. 8) and a tree data unit of a layer having a different version was returned to the object node from the link destination node (S83 of FIG. 8). In such a configuration, it is possible that all tree data units of Layer 2 and the following layers are transmitted from a link destination node to an object node and version information is compared on the object node side.

[Supplements]

The above extended Koorde algorism is effectively applied also to ones other than the aspects illustrated by the embodiments and the examples described above. For example, the extended Koorde algorism may be applied to a DHT (Distributed Hash Table) in a data structure where attribute values are not ordered. In this case, the following embodiments are conceivable.

A distributed data management device for achieving at least one object logical node among a plurality of logical nodes storing a plurality of partial data units where data units are divided, wherein
  the object logical node includes:
  a node identifier storage unit for storing, as an object node identifier, an identifier assigned to the object logical node among a plurality of identifiers uniquely assigned to the plurality of logical nodes respectively in a finite identifier space having a ring structure;
  a data storage unit for storing at least one of the plurality of partial data units; and
  a link table for storing link information indicating a communicable relationship between the object logical node and another logical node, the link information including a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

A distributed data management method, wherein
a computer for implementing at least one object logical node among a plurality of logical nodes storing a plurality of partial data units where data units are divided, the object logical node including a node identifier storage unit for storing, as an object node identifier, an identifier assigned to the object logical node among a plurality of identifiers each uniquely assigned to the plurality of logical nodes in a finite identifier space having a ring structure and a data storage unit for storing at least one of the plurality of partial data units
generates link information indicating a communicable relationship between the object logical node and another logical node, the link information including a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

The embodiments and the modified examples described above can be combined without being contradictory to each other in the contents. Further, in a plurality of flowcharts used in the above description, a plurality of steps (processings) is described in serial order, but the execution order of processing steps executed in the present embodiment is not limited to the order in the description. In the present embodiment, the order of processing steps illustrated is changeable without a disadvantage in terms of content.

A part or all of the embodiments and the modified examples can be identified also as the following supplementary notes. However, the embodiments and the modified examples are not limited to the following description.

(Supplementary Note 1)

A distributed data management device for achieving at least one object logical node among a plurality of logical nodes storing a plurality of partial data units where data units ordered in attribute value order are divided, the plurality of partial data units each having a value range with respect to each attribute, wherein
  the object logical node includes:
  a node identifier storage unit for storing, as an object node identifier, an identifier assigned to the object logical node among a plurality of identifiers uniquely assigned to the plurality of logical nodes respectively in a finite identifier space having a ring structure;
  a data storage unit for storing at least one of the plurality of partial data units;
  a link table for storing link information indicating a communicable relationship between the object logical node and another logical node, the link information between the object logical node and a link destination logical node being established according to a relationship with the object node identifier in the identifier space;
  a value range storage unit for storing a value range boundary value with respect to each attribute corresponding to the partial data unit stored on the data storage unit, a value range boundary with respect to the each attribute being located between the object logical node and a logical node adjacent to the object logical node in the identifier space; and
  a tree storage unit for storing a tree structure data unit with respect to each attribute including a plurality of tree nodes each indicating a value range for identifying a logical node storing the partial data unit corresponding to an access request, the tree structure data unit including a root tree node including at least one entry formed with a pointer pointing to a child tree node associated with the link destination logical node and a value indicating a value range for selecting the pointer.

(Supplementary Note 2)

The distributed data management device according to Supplementary Note 1, wherein
  the object logical node further includes
  a tree generation unit for acquiring a tree data unit from the link destination logical node associated with the pointer included in the root tree node and generating at least one tree node lower than the root tree node from the acquired tree data unit.

(Supplementary Note 3)

The distributed data management device according to Supplementary Note 2, wherein
  the tree structure data unit stored on the tree storage unit includes a plurality of layers and a tree data unit for each layer, a tree data unit of a first layer includes an entry corresponding to value range information stored on the value range storage unit in the link destination logical node, and a tree data unit or tree data units of Layer L (L is at least 2) higher than the first layer includes the root tree node, and
  the tree generation unit acquires a tree data unit of Layer (L−1) stored on the link destination logical node from the link destination logical node associated with the pointer included in the root tree node and generates a partial tree data unit corresponding to the link destination logical node in the tree data unit of Layer L from the acquired tree data unit of Layer (L−1).

(Supplementary Note 4)

The distributed data management device according to Supplementary Note 3, wherein each tree node including the each tree data unit stored on the tree storage unit includes version information, and the object logical node further includes:

a tree update unit for transmitting a version confirmation request where version information of a child tree node pointed to by the pointer is set to the link destination logical node associated with the pointer included in the root tree node of Layer L and updating each tree node and version information of the each tree node using a tree data unit and version information included in a reply from the link destination logical node in response to the version confirmation request; and a version comparison unit for receiving the version confirmation request from another logical node, comparing version information on Layer L included in the version confirmation request with version information of each tree data unit of Layer (L−1) possessed by the object logical node, and returning a tree data unit of Layer (L−1) having a different version to the another logical node together with version information.

(Supplementary Note 5)

The distributed data management device according to Supplementary Note 4, wherein the object logical node further includes a tree search unit for identifying an entry including an attribute value to be searched in a value range from the tree structure data unit, using an inclusion determination based on a circulating order of an attribute value space, including a case where a value range boundary value indicated by a first entry of a tree node included in the tree structure data unit regarding a search object attribute is designated as a reference value in an attribute value space of the search object attribute and an arbitrary value somewhere from the reference value to a maximum value in the attribute value space is smaller than an arbitrary value somewhere from a minimum value in the attribute value space to the reference value.

(Supplementary Note 6)

The distributed data management device according to Supplementary Note 5, wherein a value range including none of the attribute values in the attribute value space is set in the root tree node of each layer, and when an entry including the search object attribute value in a value range is not identified from the tree data unit of a certain layer, the tree search unit tries to search a tree data unit of a layer higher by one stage, and when the tree data unit of the layer higher by one stage is absent, the tree search unit requests the tree generation unit to generate the tree data unit of the layer higher by one stage.

(Supplementary Note 7)

The distributed data management device according to any one of Supplementary Notes 1 to 6, wherein the link information stored on the link table includes a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

(Supplementary Note 8)

The distributed data management device according to any one of Supplementary Notes 4 to 6, wherein the link table stores, from the object logical node, link information including a plurality of links to a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space, the tree update unit transmits the version confirmation request in a polling interval T, and the object logical node further includes a parameter setting unit for acquiring a system constraint time wc for a maximum time until a change of a value range in at least one of the plurality of logical nodes is transmitted to all the plurality of logical nodes or a system constraint load λc for a unit time load where each of the logical nodes transmits the version confirmation request and calculating the polling interval T by applying the acquired system constraint time wc or the acquired system constraint load λc and a total number N of the logical nodes or a number D of link destination nodes of the object logical node to the following (Equation 1) or the following (Equation 2):

$$T = \frac{wc}{\log_k N} \quad \text{(Equation 1)}$$

$$T = \frac{D}{\lambda c} \quad \text{(Equation 2)}$$

wherein k represents the parameter k.

(Supplementary Note 9)

The distributed data management device according to Supplementary Note 7 or 8, wherein the parameter k is set to be 4.

(Supplementary Note 10)

A distributed data operation device for storing a partial data unit corresponding to an access request and identifying the object logical node achieved by the distributed data management device according to Supplementary Note 6 as an address of the access request, the distributed data operation device including:

a link table for storing link information communicable with a plurality of link destination logical nodes including the object logical node;

the tree storage unit;

the tree update unit; and
the tree search unit.

(Supplementary Note 11)

A program causing a computer to implement at least one object logical node among a plurality of logical nodes storing a plurality of partial data units where data units ordered in attribute value order are divided, the plurality of partial data units each having a value range with respect to each attribute, wherein the object logical node includes:

a node identifier storage unit for storing, as an object node identifier, an identifier assigned to the object logical node among a plurality of identifiers uniquely assigned to the plurality of logical nodes respectively in a finite identifier space having a ring structure;

a data storage unit for storing at least one of the plurality of partial data units;

a link table for storing link information indicating a communicable relationship between the object logical node and another logical node, the link information between the object logical node and a link destination logical node being established according to a relationship with the object node identifier in the identifier space;

a value range storage unit for storing a value range boundary value with respect to each attribute corresponding to the partial data unit stored on the data storage unit, a value range boundary with respect to the each attribute being located between the object logical node and a logical node adjacent to the object logical node in the identifier space; and a tree storage unit for storing a tree structure data unit with respect to each attribute including a plurality of tree nodes each indicating a value range for identifying a logical node storing the partial data unit corresponding to an access request, the tree structure data unit including a root tree node including at least one entry formed with a pointer pointing to a child tree node associated with the link destination logical node and a value indicating a value range for selecting the pointer.

(Supplementary Note 12)

The program according to Supplementary Note 11, wherein the object logical node further includes a tree generation unit for acquiring a tree data unit from the link destination logical node associated with the pointer included in the root tree node and generating at least one tree node lower than the root tree node from the acquired tree data unit.

(Supplementary Note 13)

The program according to Supplementary Note 12, wherein the tree structure data unit stored on the tree storage unit includes a plurality of layers and a tree data unit for each layer, a tree data unit of a first layer includes an entry corresponding to value range information stored on the value range storage unit in the link destination logical node, and a tree data unit or tree data units of Layer L (L is at least 2) higher than the first layer includes the root tree node, and the tree generation unit acquires a tree data unit of Layer (L−1) stored on the link destination logical node from the link destination logical node associated with the pointer included in the root tree node and generates a partial tree data unit corresponding to the link destination logical node in the tree data unit of Layer L from the acquired tree data unit of Layer (L−1).

(Supplementary Note 14)

The program according to Supplementary Note 13, wherein each tree node including the each tree data unit stored on the tree storage unit includes version information, and the object logical node further includes:

a tree update unit for transmitting a version confirmation request where version information of a child tree node pointed to by the pointer is set to the link destination logical node associated with the pointer included in the root tree node of Layer L and updating each tree node and version information of the each tree node using a tree data unit and version information included in a reply from the link destination logical node in response to the version confirmation request; and a version comparison unit for receiving the version confirmation request from another logical node, comparing version information on Layer L included in the version confirmation request with version information of each tree data unit of Layer (L−1) possessed by the object logical node, and returning a tree data unit of Layer (L−1) having a different version to the another logical node together with version information.

(Supplementary Note 15)

The program according to Supplementary Note 14, wherein the object logical node further includes a tree search unit for identifying an entry including an attribute value to be searched in a value range from the tree structure data unit, using an inclusion determination based on a circulating order of an attribute value space, including a case where a value range boundary value indicated by a first entry of a tree node included in the tree structure data unit regarding a search object attribute is designated as a reference value in an attribute value space of the search object attribute and an arbitrary value somewhere from the reference value to a maximum value in the attribute value space is smaller than an arbitrary value somewhere from a minimum value in the attribute value space to the reference value.

(Supplementary Note 16)

The program according to Supplementary Note 15, wherein a value range including none of the attribute values in the attribute value space is set in the root tree node of each layer, and when an entry including the search object attribute value in a value range is not identified from the tree data unit of a certain layer, the tree search unit tries to search a tree data unit of a layer higher by one stage, and when the tree data unit of the layer higher by one stage is absent, the tree search unit requests the tree generation unit to generate the tree data unit of the layer higher by one stage.

(Supplementary Note 17)

The program according to any one of Supplementary Notes 11 to 16, wherein the link information stored on the link table includes a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

(Supplementary Note 18)

The program according to Supplementary Note 14, wherein
the link table stores, from the object logical node, link information including a plurality of links to a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space,
the tree update unit transmits the version confirmation request in a polling interval T, and
the object logical node further includes
a parameter setting unit for acquiring a system constraint time wc for a maximum time until a change of a value range in at least one of the plurality of logical nodes is transmitted to all the plurality of logical nodes or a system constraint load λc for a unit time load where each of the logical nodes transmits the version confirmation request and calculating the polling interval T by applying the acquired system constraint time wc or the acquired system constraint load λc and a total number N of the logical nodes or a number D of link destination nodes of the object logical node to the following (Equation 1) or the following (Equation 2):

$$T = \frac{wc}{\log_k N} \quad \text{(Equation 1)}$$

$$T = \frac{D}{\lambda c} \quad \text{(Equation 2)}$$

wherein k represents the parameter k.

(Supplementary Note 19)

The program according to Supplementary Note 17 or 18, wherein the parameter k is set to be 4.

(Supplementary Note 20)

A distributed data management device for achieving at least one object logical node among a plurality of logical nodes storing a plurality of partial data units where data units are divided, wherein
the object logical node includes:
a node identifier storage unit for storing, as an object node identifier, an identifier assigned to the object logical node among a plurality of identifiers uniquely assigned to the plurality of logical nodes respectively in a finite identifier space having a ring structure;
a data storage unit for storing at least one of the plurality of partial data units; and
a link table for storing link information indicating a communicable relationship between the object logical node and another logical node, the link information including a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

(Supplementary Note 21)

A distributed data management method, wherein
a computer for implementing at least one object logical node among a plurality of logical nodes storing a plurality of partial data units where data units are divided, the object logical node including a node identifier storage unit for storing, as an object node identifier, an identifier assigned to the object logical node among a plurality of identifiers each uniquely assigned to the plurality of logical nodes in a finite identifier space having a ring structure and a data storage unit for storing at least one of the plurality of partial data units
generates link information indicating a communicable relationship between the object logical node and another logical node, the link information including a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

(Supplementary Note 22)

A computer-readable recording medium for recording the program according to any one of Supplementary Notes 11 to 19.

This application claims priority based on Japanese Patent Application No. 2012-111189, filed on May 15, 2012, the entire disclosure of which is incorporated by reference herein.

The invention claimed is:

1. A distributed data management device that achieves at least one object logical node among a plurality of logical nodes storing a plurality of partial data units where data units ordered in attribute value order are divided, the plurality of partial data units each having a value range with respect to each attribute,
the object logical node comprising:
a memory configured to store instructions; and
at least one processor configured to execute the stored instructions to implement:
a node identifier storage unit that stores, as an object node identifier, an identifier assigned to the object logical node among a plurality of identifiers uniquely assigned to the plurality of logical nodes respectively, in a finite identifier space having a ring structure;

a data storage unit that stores at least one of the plurality of partial data units;

a link table that stores link information indicating a communicable relationship between the object logical node and another logical node, the link information between the object logical node and a link destination logical node being established according to a relationship with the object node identifier in the identifier space;

a value range storage unit that stores a value range boundary value with respect to each attribute corresponding to the partial data unit stored on the data storage unit, a value range boundary with respect to the each attribute being located between the object logical node and a logical node adjacent to the object logical node in the identifier space; and a tree storage unit that stores a tree structure data unit with respect to each attribute including a plurality of tree nodes each indicating a value range for identifying a logical node storing the partial data unit corresponding to an access request, the tree structure data unit including a root tree node including at least one entry formed with a pointer pointing to a child tree node associated with the link destination logical node and a value indicating a value range for selecting the pointer, wherein the link information stored on the link table includes a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

2. The distributed data management device according to claim 1, wherein the at least one processor is further configured to execute the stored instructions to implement:

a tree generation unit that acquires a tree data unit from the link destination logical node associated with the pointer included in the root tree node and generating at least one tree node lower than the root tree node from the acquired tree data unit.

3. The distributed data management device according to claim 2, wherein the tree structure data unit stored on the tree storage unit includes a plurality of layers and a tree data unit for each layer, a tree data unit of a first layer includes an entry corresponding to value range information stored on the value range storage unit in the link destination logical node, and a tree data unit or tree data units of Layer L (L is at least 2) higher than the first layer includes the root tree node, and the tree generation unit acquires a tree data unit of Layer (L−1) stored on the link destination logical node from the link destination logical node associated with the pointer included in the root tree node and generates a partial tree data unit corresponding to the link destination logical node in the tree data unit of Layer L from the acquired tree data unit of Layer (L−1).

4. The distributed data management device according to claim 3, wherein each tree node including the each tree data unit stored on the tree storage unit includes version information, and the at least one processor is further configured to execute the stored instructions to implement:

a tree update unit that transmits a version confirmation request where version information of a child tree node pointed to by the pointer is set to the link destination logical node associated with the pointer included in the root tree node of Layer L and updates each tree node and version information of the each tree node using a tree data unit and version information included in a reply from the link destination logical node in response to the version confirmation request; and a version comparison unit that receives the version confirmation request from another logical node, compares version information on Layer L included in the version confirmation request with version information of each tree data unit of Layer (L−1) possessed by the object logical node, and returns a tree data unit of Layer (L−1) having a different version to the another logical node together with version information.

5. The distributed data management device according to claim 4, wherein the at least one processor is further configured to execute the stored instructions to implement:

a tree search unit that identifies an entry including an attribute value to be searched in a value range from the tree structure data unit, using an inclusion determination based on a circulating order of an attribute value space, including a case where a value range boundary value indicated by a first entry of a tree node included in the tree structure data unit regarding a search object attribute is designated as a reference value in an attribute value space of the search object attribute and an arbitrary value somewhere from the reference value to a maximum value in the attribute value space is smaller than an arbitrary value somewhere from a minimum value in the attribute value space to the reference value.

6. The distributed data management device according to claim 4, wherein the link table stores, from the object logical node, link information including a plurality of links to a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space, the tree update unit transmits the version confirmation request in a polling interval T, and the at least one processor is further configured to execute the stored instructions to implement:
a parameter setting unit that acquires a system constraint time wc for a maximum time until a change of a value range in at least one of the plurality of logical nodes is transmitted to all the plurality of logical nodes or a system constraint load λc for a unit time load where each of the logical nodes transmits the version confirmation request and calculates the polling interval T by applying the acquired system constraint time wc or the acquired system constraint load λc and a total number N of the logical nodes or a number D of link destination nodes of the object logical node to the following (Equation 1) or the following (Equation 2):

$$T = \frac{wc}{\log_k N} \quad \text{(Equation 1)}$$

$$T = \frac{D}{\lambda c} \quad \text{(Equation 2)}$$

wherein k represents the parameter k.

7. The distributed data management device according to claim 5, wherein
a value range including none of the attribute values in the attribute value space is set in the root tree node of each layer, and
when an entry including the search object attribute value in a value range is not identified from the tree data unit of a certain layer, the tree search unit tries to search a tree data unit of a layer higher by one stage, and when the tree data unit of the layer higher by one stage is absent, the tree search unit requests the tree generation unit to generate the tree data unit of the layer higher by one stage.

8. A distributed data operation device for storing a partial data unit corresponding to an access request and identifying the object logical node achieved by the distributed data management device according to claim 7 as an address of the access request, the distributed data operation device comprising:
a link table that stores link information communicable with a plurality of link destination logical nodes including the object logical node;
the tree storage unit;
the tree update unit; and
the tree search unit.

9. The distributed data management device according to claim 1, wherein the parameter k is set to be 4.

10. A non-transitory computer-readable storage medium storing a program causing a computer to implement at least one object logical node among a plurality of logical nodes storing a plurality of partial data units where data units ordered in attribute value order are divided, the plurality of partial data units each having a value range with respect to each attribute,
the object logical node comprising:
a node identifier storage unit that stores, as an object node identifier, an identifier assigned to the object logical node among a plurality of identifiers uniquely assigned to the plurality of logical nodes respectively in a finite identifier space having a ring structure;
a data storage unit that stores at least one of the plurality of partial data units;
a link table that stores link information indicating a communicable relationship between the object logical node and another logical node, the link information between the object logical node and a link destination logical node being established according to a relationship with the object node identifier in the identifier space;
a value range storage unit that stores a value range boundary value with respect to each attribute corresponding to the partial data unit stored on the data storage unit, a value range boundary with respect to the each attribute being located between the object logical node and a logical node adjacent to the object logical node in the identifier space; and
a tree storage unit that stores a tree structure data unit with respect to each attribute including a plurality of tree nodes each indicating a value range for identifying a logical node storing the partial data unit corresponding to an access request, the tree structure data unit including a root tree node including at least one entry formed with a pointer pointing to a child tree node associated with the link destination logical node and a value indicating a value range for selecting the pointer,
wherein the link information stored on the link table includes a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

11. The non-transitory computer-readable storage medium storing the program according to claim 10, wherein the object logical node further comprises a tree generation unit that acquires a tree data unit from the link destination logical node associated with the pointer included in the root tree node and generating at least one tree node lower than the root tree node from the acquired tree data unit.

12. The non-transitory computer-readable storage medium storing the program according to claim 11, wherein
the tree structure data unit stored on the tree storage unit includes a plurality of layers and a tree data unit for each layer, a tree data unit of a first layer includes an entry corresponding to value range information stored on the value range storage unit in the link destination logical node, and a tree data unit or tree data units of Layer L (L is at least 2) higher than the first layer includes the root tree node, and
the tree generation unit acquires a tree data unit of Layer (L−1) stored on the link destination logical node from the link destination logical node associated with the pointer included in the root tree node and generates a partial tree data unit corresponding to the link destination logical node in the tree data unit of Layer L from the acquired tree data unit of Layer (L−1).

13. The non-transitory computer-readable storage medium storing the program according to claim 12, wherein each tree node including the each tree data unit stored on the tree storage unit includes version information, and the object logical node further comprises:
a tree update unit that transmits a version confirmation request where version information of a child tree node pointed to by the pointer is set to the link destination logical node associated with the pointer included in the root tree node of Layer L and updates each tree node and version information of the each tree node using a tree data unit and version information included in a reply from the link destination logical node in response to the version confirmation request; and
a version comparison unit that receives the version confirmation request from another logical node, compares version information on Layer L included in the version confirmation request with version information of each tree data unit of Layer (L−1) possessed by the object logical node, and returns a tree data unit of Layer (L−1) having a different version to the another logical node together with version information.

14. The non-transitory computer-readable storage medium storing the program according to claim 13, wherein
the object logical node further comprises
a tree search unit that identifies an entry including an attribute value to be searched in a value range from the tree structure data unit, using an inclusion determination based on a circulating order of an attribute value space, including a case where a value range boundary value indicated by a first entry of a tree node included in the tree structure data unit regarding a search object attribute is designated as a reference value in an attribute value space of the search object attribute and an arbitrary value somewhere from the reference value to a maximum value in the attribute value space is smaller than an arbitrary value somewhere from a minimum value in the attribute value space to the reference value.

15. The non-transitory computer-readable storage medium storing the program according to claim 13, wherein
the link table stores, from the object logical node, link information including a plurality of links to a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space,
the tree update unit transmits the version confirmation request in a polling interval T, and
the object logical node further comprises
a parameter setting unit that acquires a system constraint time wc for a maximum time until a change of a value range in at least one of the plurality of logical nodes is transmitted to all the plurality of logical nodes or a system constraint load λc for a unit time load where each of the logical nodes transmits the version confirmation request and calculates the polling interval T by applying the acquired system constraint time wc or the acquired system constraint load λc and a total number N of the logical nodes or a number D of link destination nodes of the object logical node to the following (Equation 1) or the following (Equation 2):

$$T = \frac{wc}{\log_k N} \quad \text{(Equation 1)}$$

$$T = \frac{D}{\lambda c} \quad \text{(Equation 2)}$$

wherein k represents the parameter k.

16. The non-transitory computer-readable storage medium storing the program according to claim 14, wherein
a value range including none of the attribute values in the attribute value space is set in the root tree node of each layer, and
when an entry including the search object attribute value in a value range is not identified from the tree data unit of a certain layer, the tree search unit tries to search a tree data unit of a layer higher by one stage, and when the tree data unit of the layer higher by one stage is absent, the tree search unit requests the tree generation unit to generate the tree data unit of the layer higher by one stage.

17. The non-transitory computer-readable storage medium storing the program according to claim 10, wherein
the parameter k is set to be 4.

18. A distributed data management device for achieving at least one object logical node among a plurality of logical nodes storing a plurality of partial data units where data units are divided,
the object logical node comprising:
a memory configured to store instructions; and
at least one processor configured to execute the stored instructions to implement:
a node identifier storage unit that stores, as an object node identifier, an identifier assigned to the object logical node among a plurality of identifiers uniquely assigned to the plurality of logical nodes respectively in a finite identifier space having a ring structure;
a data storage unit that stores at least one of the plurality of partial data units; and
a link table that stores link information indicating a communicable relationship between the object logical node and another logical node, the link information including a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

19. A distributed data management method, wherein
a computer for implementing at least one object logical node among a plurality of logical nodes storing a plurality of partial data units where data units are divided, the object logical node comprising a node identifier storage unit that stores, as an object node identifier, an identifier assigned to the object logical node among a plurality of identifiers each uniquely assigned to the plurality of logical nodes in a finite identifier space having a ring structure and a data storage unit that stores at least one of the plurality of partial data units generates link information indicating a communicable relationship between the object logical node and another logical node, the link information including a plurality of links between the object logical node and each of a first link destination logical node having a value obtained by multiplying the object node identifier by a parameter k (k is a natural number) or an identifier smaller than and immediately close to the value, a second link destination logical node having a value obtained by multiplying an identifier of a successor logical node having an identifier larger than and immediately close to the object node identifier by the parameter k or an identifier smaller than and immediately close to the value, and at least one third link destination logical node having an identifier somewhere from the identifier of the first link destination logical node to the identifier of the second link destination logical node in the identifier space.

* * * * *